United States Patent
Wang et al.

(10) Patent No.: US 12,191,976 B2
(45) Date of Patent: Jan. 7, 2025

(54) BEAM INFORMATION INDICATION METHOD AND APPARATUS

(71) Applicant: HUAWEI TECHNOLOGIES CO., LTD., Shenzhen (CN)

(72) Inventors: Yu Wang, Hangzhou (CN); Yunfei Qiao, Hangzhou (CN); Xueliang Shi, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 18/158,298

(22) Filed: Jan. 23, 2023

(65) Prior Publication Data

US 2023/0163836 A1 May 25, 2023

Related U.S. Application Data

(63) Continuation of application No. PCT/CN2021/102702, filed on Jun. 28, 2021.

(30) Foreign Application Priority Data

Jul. 24, 2020 (CN) .......................... 202010724641

(51) Int. Cl.
*H04B 7/185* (2006.01)
*H04B 7/08* (2006.01)

(52) U.S. Cl.
CPC ....... *H04B 7/18513* (2013.01); *H04B 7/0857* (2013.01)

(58) Field of Classification Search
CPC .................................... H04B 7/18513
USPC ............................................. 375/347
See application file for complete search history.

(56) References Cited

U.S. PATENT DOCUMENTS

| | | | |
|---|---|---|---|
| 2008/0102812 A1* | 5/2008 | Chari ............... | H01Q 9/0435 |
| | | | 455/424 |
| 2018/0205589 A1* | 7/2018 | Bai .................. | H04L 27/2672 |
| 2019/0312626 A1 | 10/2019 | Ueyama et al. | |
| 2019/0312629 A1 | 10/2019 | Tang | |
| 2020/0186232 A1* | 6/2020 | Levitsky ........... | H04B 7/0617 |
| 2020/0337028 A1* | 10/2020 | Li .................... | H04L 5/0094 |

FOREIGN PATENT DOCUMENTS

| | | |
|---|---|---|
| EP | 3490318 A1 | 5/2019 |
| WO | 2018000421 A1 | 1/2018 |

\* cited by examiner

*Primary Examiner* — Lihong Yu
(74) *Attorney, Agent, or Firm* — Leydig, Voit & Mayer, Ltd.

(57) ABSTRACT

This disclosure provides a beam information indication method and an apparatus. The terminal device obtains reference domain information of a plurality of beams and a first offset corresponding to each moment, to update beam domain information, where the first offset indicates an offset of domain information of the plurality of beams relative to the reference domain information of the plurality of beams. In technical solutions provided in this disclosure, domain information of the plurality of beams can be updated with low signaling overheads. The technical solutions may be applied to a satellite communication system, to implement interference management of satellite beams.

20 Claims, 9 Drawing Sheets

BEAM INFORMATION INDICATION METHOD AND APPARATUS

CROSS-REFERENCE TO RELATED APPLICATIONS

This disclosure is a continuation of International Application No. PCT/CN2021/102702, filed on Jun. 28, 2021, which claims priority to Chinese Patent Application No. 202010724641.7, filed on Jul. 24, 2020. The disclosures of the aforementioned applications are hereby incorporated by reference in their entireties.

TECHNICAL FIELD

The present disclosure relates to the field of wireless communication, and in particular, to a beam information indication method in wireless communication and a related apparatus.

BACKGROUND

Satellite communication has prominent advantages such as global coverage, long-distance transmission, flexible networking, convenient deployment, and being not restricted by geographical conditions, and has been widely applied to a plurality of fields such as maritime communication, positioning and navigation, disaster relief, scientific experiments, video broadcasting, and earth observation. In addition, a future terrestrial fifth-generation (5G) mobile network will have a complete industry chain, a huge user base, a flexible and efficient application service mode, and the like. A satellite communication system and 5G are combined to complement each other, thereby jointly constituting a sea-land-air-space integrated communication network with seamless global coverage, to satisfy users' requirement for ubiquitous service. This is an important development direction of future communication. In particular, the next-generation satellite network is characterized by ultra-dense networking. A scale of the satellite network evolves from 66 Iridium constellations to 720 Oneweb satellites, and finally expands to more than 12,000 Starlink ultra-dense low earth orbit satellite constellations.

In the satellite communication system, efficient interference management is a core technology to improve system throughput. To reduce interference, frequency and polarization multiplexing is used in satellite communication. Multi-color multiplexing is commonly used. Multi-color multiplexing means that indicating frequency or a polarization mode corresponding to a beam by using a color. One color may represent one frequency or one polarization mode, for example, left-hand circular polarization (LHCP) or right-hand circular polarization (RHCP). In a dynamic satellite scenario, color multiplexing information of a beam needs to be dynamically adjusted. Color multiplexing information of the beam refers to information such as frequency and a polarization mode corresponding to all beams of a satellite. The satellite may dynamically adjust and broadcast color multiplexing information of the satellite at a specific interval, or deliver color multiplexing information in a subsequent time period in advance. There is a problem of excessively high signaling overheads in this process, which is undesirable for a large-scale beam system (of hundreds or even thousands of beams).

SUMMARY

This application provides a beam information indication method and an apparatus, which may be applied to the field of wireless communication, and in particular, can effectively reduce signaling overheads in interference management of satellite communication.

According to a first aspect, this application provides a beam information indication method. The method includes: A first communication apparatus obtains a first offset, where the first offset indicates an offset of domain information of a plurality of beams relative to reference domain information of the plurality of beams, and the domain information includes one or more of the following information: time domain information, frequency domain information, and polarization domain information.

The first communication apparatus updates the domain information of the plurality of beams based on the reference domain information of the plurality of beams and the first offset.

In this embodiment of this application, the reference domain information of the plurality of beams and a first offset corresponding to each moment are obtained, to update domain information of the plurality of beams at each moment. Indicating an offset requires fewer indication overheads than indicating domain information. Therefore, this reduces signaling overheads compared with a case in which domain information of all beams is directly delivered at each moment or domain information of all beams within a time period is delivered at a specific moment.

With reference to the first aspect, in a possible implementation, the first offset is an offset relative to a reference domain information identifier or the reference domain information.

In the foregoing solution, reference domain information of each beam corresponds to one identifier, the identifier of each beam reference domain information is offset by using the first offset, to obtain a new domain information identifier corresponding to the beam, and domain information indicated by the identifier is obtained by using the new domain information identifier. Specific setting and explanation of the identifier are described in the following description of embodiments, and details are not described herein again.

Optionally, the first offset may alternatively be used for directly performing offset on the reference domain information of the beams, to reduce calculation complexity.

It should be noted that, if the first offset is the offset relative to the reference domain information identifier, the first offset corresponds to a first offset identifier or a first offset index. If the first offset is an offset relative to the reference domain information, the first offset corresponds to a specific offset.

With reference to the first aspect, in a possible implementation, the reference domain information is domain information obtained at a reference moment or domain information determined before a current moment.

With reference to the first aspect, in a possible implementation, the domain information is carried in a bandwidth part BWP information element.

With reference to the first aspect, in a possible implementation, the first communication apparatus obtains a second offset, where the second offset is different from the first offset, and the second offset indicates an offset of domain information of at least one beam other than the plurality of beams relative to reference domain information of the at least one beam.

Based on this solution, the first communication apparatus obtains the first offset and the second offset, to update the domain information of the beams. This solution is applicable to a beam hopping satellite system. Different clusters of beams correspond to respective offsets. This helps reduce beam interference between different clusters of beams, and can reduce signaling overheads in a beam domain information update process.

With reference to the first aspect, in a possible implementation, the time domain information includes a frame, a subframe, a slot, a mini-slot, or a symbol.

With reference to the first aspect, in a possible implementation, the frequency domain information includes a frequency or a frequency channel number.

With reference to the first aspect, in a possible implementation, the polarization domain information includes at least one of left hand circular polarization LHCP and right hand circular polarization RHCP.

With reference to the first aspect, in a possible implementation, beam information of the plurality of beams is updated periodically, and the beam information includes at least one of the reference domain information, the first offset, and a quantity of beams.

With reference to the first aspect, in a possible implementation, reference domain information of the plurality of beams in a current period is different from reference domain information of the plurality of beams in a period before the current period. Alternatively, a value range of the first offset of the plurality of beams in a current period is different from that in a period before the current period. Alternatively, a quantity of beams in a current period is different from that in a period before the current period.

It should be understood that, the value range of the first offset of the plurality of beams is a value range of a first offset corresponding to the reference domain information of the plurality of beams.

Based on this solution, the beam information is periodically updated, so that the beam information can be flexibly configured, and efficient beam interference management is implemented.

With reference to the first aspect, in a possible implementation, if the first communication apparatus does not obtain the reference domain information within preset duration, the first communication apparatus requests the reference domain information from a second communication apparatus.

With reference to the first aspect, in a possible implementation, if content of the reference domain information obtained by the first communication apparatus is incorrect, the first communication apparatus requests the reference domain information from a second communication apparatus.

With reference to the first aspect, in a possible implementation, when a timer of the reference domain information expires, the first communication apparatus requests the reference domain information from a second communication apparatus.

Based on the foregoing solution, the first communication apparatus needs to request the reference domain information from the second communication apparatus as required, to ensure that the first communication apparatus obtains accurate reference domain information in a timely manner, to further implement effective beam interference management.

With reference to the first aspect, in a possible implementation, the first offset is carried in a system information block SIB.

According to a second aspect, this application provides a beam information indication method. The method includes: A second communication apparatus determines a first offset, where the first offset indicates an offset of domain information of a plurality of beams relative to reference domain information of the plurality of beams, and the domain information includes one or more of the following information: time domain information, frequency domain information, and polarization domain information.

The second communication apparatus sends the first offset.

With reference to the second aspect, in a possible implementation, the first offset is an offset relative to a reference domain information identifier or the reference domain information.

In the foregoing solution, reference domain information of each beam corresponds to one identifier, the identifier of each beam reference domain information is offset by using the first offset, to obtain a new domain information identifier corresponding to the beam, and domain information indicated by the identifier is obtained by using the new domain information identifier. Specific setting and explanation of the identifier are described in the following description of embodiments, and details are not described herein again.

Optionally, the first offset may alternatively be used for directly performing offset on the reference domain information of the beams, to reduce calculation complexity.

It should be noted that, if the first offset is the offset relative to the reference domain information identifier, the first offset corresponds to a first offset identifier or a first offset index. If the first offset is an offset relative to the reference domain information, the first offset corresponds to a specific offset.

With reference to the second aspect, in a possible implementation, the reference domain information is domain information sent at a reference moment.

With reference to the second aspect, in a possible implementation, the domain information is carried in a bandwidth part BWP information element.

With reference to the second aspect, in a possible implementation, the second communication apparatus sends a second offset, where the second offset is different from the first offset, and the second offset indicates an offset of domain information of at least one beam other than the plurality of beams relative to reference domain information of the at least one beam.

Based on this solution, the second communication apparatus sends the first offset and the second offset. This solution is applicable to a beam hopping satellite system. Different clusters of beams correspond to respective offsets. This helps reduce beam interference between different clusters of beams, and can reduce signaling overheads in a beam domain information update process.

With reference to the second aspect, in a possible implementation, the second communication apparatus sends a domain information identifier, where the domain information identifier indicates the domain information of the plurality of beams.

With reference to the foregoing second aspect, in a possible implementation, the second communication apparatus sends a reference multiplexing information identifier and a reference multiplexing information identifier change value, where the reference multiplexing information identifier change value indicates a value of a changed reference multiplexing information identifier.

With reference to the second aspect, in a possible implementation, the time domain information includes a frame, a subframe, a slot, a mini-slot, or a symbol.

With reference to the second aspect, in a possible implementation, the frequency domain information includes a frequency or a frequency channel number.

With reference to the second aspect, in a possible implementation, the polarization domain information includes at least one of left hand circular polarization LHCP and right hand circular polarization RHCP.

With reference to the second aspect, in a possible implementation, beam information of the plurality of beams is updated periodically, and the beam information includes at least one of the reference domain information, the first offset, and a quantity of beams.

With reference to the second aspect, in a possible implementation, reference domain information of the plurality of beams in a current period is different from reference domain information of the plurality of beams in a period before the current period. Alternatively, a value range of the first offset of the plurality of beams in a current period is different from that in a period before the current period. Alternatively, a quantity of beams in a current period is different from that in a period before the current period.

Based on this solution, the beam information is periodically updated, so that the beam information can be flexibly configured, and efficient beam interference management is implemented.

With reference to the second aspect, in a possible implementation, the second communication apparatus sends the reference domain information of the plurality of beams to a first communication apparatus.

Based on this solution, the second communication apparatus responds to a request of the first communication apparatus for the reference domain information, to ensure that the first communication apparatus obtains accurate reference domain information in a timely manner, to further implement effective beam interference management.

With reference to the second aspect, in a possible implementation, the first offset is carried in a system information block SIB, and is sent by broadcasting.

Based on this solution, the first offset is sent by broadcasting, to effectively reduce signaling overheads.

According to a third aspect, this application provides a method for enabling/disabling a beam. The method includes:

A third communication apparatus obtains location information of another communication apparatus.

The third communication apparatus determines a coverage area of the third communication apparatus based on location information of the third communication apparatus and the location information of the another communication apparatus.

The third communication apparatus determines, based on whether a center point of a beam is in the coverage area of the third communication apparatus, to enable or disable the beam.

It should be understood that the another communication apparatus is a communication apparatus other than the third communication apparatus. For example, the third communication apparatus and the another communication apparatus are satellites.

Based on the foregoing solution, when the communication apparatuses are close to each other, beam interference between different communication apparatuses increases. The communication apparatus determines, based on a coverage area of the communication apparatus, to enable or disable a beam, so that inter-satellite interference can be effectively reduced.

With reference to the foregoing third aspect, in a possible implementation, the coverage area is determined based on a Voronoi diagram. Optionally, the Voronoi diagram is two-dimensional or three-dimensional.

Based on the foregoing solution, the coverage area of the communication apparatus is determined based on the Voronoi diagram, to further determine whether a center point of a beam is in a Voronoi diagram corresponding to the communication apparatus to enable or disable the beam. This implementation is simple, full coverage of the beam of the communication apparatus can be ensured, and inter-satellite interference is also minimized.

With reference to the third aspect, in a possible implementation, if duration is greater than a preset value, or a location change between the third communication apparatus and the another communication apparatus is greater than a preset value, the third communication apparatus updates the Voronoi diagram.

Based on the foregoing solution, the Voronoi diagram of the communication apparatus can be dynamically updated. When the communication apparatus dynamically changes, the dynamically updated Voronoi diagram is used for adjusting the beam to be enabled or disabled, to achieve optimal beam interference management.

With reference to the foregoing third aspect, in a possible implementation, the third communication apparatus sends beam enabling/disabling information to the another communication apparatus, where the beam enabling/disabling information is an endpoint location or an offset of an expanded or shrunk Voronoi diagram. The offset indicates an offset of the expanded or shrunk Voronoi diagram relative to the Voronoi diagram before expansion or shrinkage.

Based on the foregoing solution, the third communication apparatus expands or shrinks the Voronoi diagram based on a load capability of the third communication apparatus, and transmits information about the expanded or shrunk Voronoi diagram between communication apparatuses. This further implements load balancing while reducing interference between the communication apparatuses.

With reference to the third aspect, in a possible implementation, the beam enabling/disabling information is carried in an XnAP message.

For example, the beam enabling/disabling information is carried in a CoveragePattern information element in the XnAP message.

According to a fourth aspect, this application provides another beam information indication method. The method includes: A first communication apparatus obtains domain information identifiers of a plurality of beams, where the domain information identifiers indicate domain information of the plurality of beams, and the domain information includes one or more of the following information: time domain information, frequency domain information, and polarization domain information. The first communication apparatus separately updates the domain information of the plurality of beams based on the domain information identifiers.

Based on the foregoing solution, the domain information identifiers indicate the domain information, so that signaling overheads can be reduced to some extent.

According to a fifth aspect, this application provides still another beam information indication method. The method includes: A second communication apparatus determines domain information identifiers of a plurality of beams, where the domain information identifiers indicate domain information of the plurality of beams, and the domain information includes one or more of the following information: time domain information, frequency domain information, and polarization domain information. The second communication apparatus sends the domain information identifiers of the plurality of beams.

According to a sixth aspect, this application provides yet another beam information indication method. The method includes: A first communication apparatus obtains a reference multiplexing information identifier and a reference multiplexing information identifier change value, where the reference multiplexing information identifier indicates reference multiplexing information of a plurality of beams, and the reference multiplexing information identifier change value indicates a value of a changed reference multiplexing information identifier. The first communication apparatus updates the reference multiplexing information of the plurality of beams based on the reference multiplexing information identifier change value.

According to a seventh aspect, this application provides still yet another embodiment beam information indication method. The method includes: A second communication apparatus determines a reference multiplexing information identifier and a reference multiplexing information identifier change value, where the reference multiplexing information identifier indicates reference multiplexing information of a plurality of beams, and the reference multiplexing information identifier change value indicates a value of a changed reference multiplexing information identifier. The second communication apparatus sends the reference multiplexing information identifier and the reference multiplexing information identifier change value.

According to an eighth aspect, this application provides a terminal device, configured to perform the method according to any possible implementation of the first aspect. The terminal device may be the first communication apparatus in any possible implementation of the first aspect, or a module applied to the terminal device, for example, a chip or a chip system. The terminal device includes a corresponding module, unit, or means for implementing the method performed by the first communication apparatus in any possible implementation of the first aspect. The module, unit, or means may be implemented by hardware, software, or corresponding software executed by hardware. The hardware or the software includes one or more modules or units corresponding to the function performed by the terminal device in any possible implementation of the first aspect.

The terminal device includes: a transceiver unit, configured to obtain a first offset, where the first offset indicates an offset of domain information of a plurality of beams relative to reference domain information of the plurality of beams, and the domain information includes one or more of the following information: time domain information, frequency domain information, and polarization domain information; and a processing unit, configured to update the domain information of the plurality of beams based on the reference domain information of the plurality of beams and the first offset.

With reference to the eighth aspect, in a possible implementation, the first offset is an offset relative to a reference domain information identifier or the reference domain information.

With reference to the eighth aspect, in a possible implementation, the reference domain information is domain information obtained at a reference moment or domain information determined before a current moment.

With reference to the eighth aspect, in a possible implementation, the domain information is carried in a bandwidth part BWP information element.

With reference to the eighth aspect, in a possible implementation, the transceiver unit is further configured to obtain a second offset, where the second offset is different from the first offset, and the second offset indicates an offset of domain information of at least one beam other than the plurality of beams relative to reference domain information of the at least one beam.

With reference to the eighth aspect, in a possible implementation, the transceiver unit is further configured to obtain a domain information identifier, where the domain information identifier indicates the domain information of the plurality of beams.

With reference to the eighth aspect, in a possible implementation, the transceiver unit is further configured to obtain a reference multiplexing information identifier and a reference multiplexing information identifier change value, where the reference multiplexing information identifier change value indicates a value of a changed reference multiplexing information identifier.

With reference to the eighth aspect, in a possible implementation, the time domain information includes a frame, a subframe, a slot, a mini-slot, or a symbol.

With reference to the eighth aspect, in a possible implementation, the frequency domain information includes a frequency or a frequency channel number.

With reference to the eighth aspect, in a possible implementation, the polarization domain information includes at least one of left hand circular polarization LHCP and right hand circular polarization RHCP.

With reference to the eighth aspect, in a possible implementation, beam information is updated periodically, and the beam information includes at least one of the reference domain information, the first offset, and a quantity of beams.

With reference to the eighth aspect, in a possible implementation, reference domain information of the plurality of beams in a current period is different from reference domain information of the plurality of beams in a period before the current period. Alternatively, a value range of the first offset in a current period is different from that in a period before the current period. Alternatively, a quantity of beams in a current period is different from that in a period before the current period.

With reference to the eighth aspect, in a possible implementation, if the transceiver unit does not obtain the reference domain information within preset duration, the transceiver unit is further configured to request the reference domain information from a network device.

With reference to the eighth aspect, in a possible implementation, if the reference domain information obtained by the transceiver unit is incorrect, the transceiver unit is further configured to re-request the reference domain information from a network device.

With reference to the eighth aspect, in a possible implementation, if a reference domain information timer expires, the transceiver unit is further configured to re-request the reference domain information from a network device.

With reference to the eighth aspect, in a possible implementation, the first offset is carried in a system information block SIB.

The terminal device provided in this application is further configured to perform the method according to any possible implementation of the fourth aspect. For example, the transceiver unit is configured to obtain domain information identifiers of a plurality of beams, where the domain information identifiers indicate domain information of the plurality of beams, and the domain information includes one or more of the following information: time domain information, frequency domain information, and polarization domain information. The processing unit is configured to separately update the domain information of the plurality of beams based on the domain information identifiers.

The terminal device provided in this application is further configured to perform the method according to any possible implementation of the sixth aspect. For example, the transceiver unit is configured to obtain a reference multiplexing information identifier and a reference multiplexing information identifier change value, where the reference multiplexing information identifier indicates reference multiplexing information of a plurality of beams, and the reference multiplexing information identifier change value indicates a value of a changed reference multiplexing information identifier. The processing unit is configured to update the reference multiplexing information of the plurality of beams based on the reference multiplexing information identifier change value.

It should be noted that, for beneficial effects of the implementations of the terminal device provided in the eighth aspect of this embodiment of this application, refer to beneficial effects of any one of the first aspect, the fourth aspect, the sixth aspect, and the possible implementations of the first aspect, the fourth aspect, and the sixth aspect. Details are not described herein again.

According to a ninth aspect, this application provides a network device, configured to perform the method according to any possible implementation of the second aspect. The network device may be the second communication apparatus in any possible implementation of the second aspect, or a module applied to the network device, for example, a chip or a chip system. The network device includes a corresponding module, unit, or means for implementing the method performed by the second communication apparatus in any possible implementation of the second aspect. The module, unit, or means may be implemented by hardware, software, or corresponding software executed by hardware. The hardware or the software includes one or more modules or units corresponding to the function performed by the network device in any possible implementation of the second aspect.

The network device includes: a processing unit, configured to determine a first offset, where the first offset indicates an offset of domain information of a plurality of beams relative to reference domain information of the plurality of beams, and the domain information includes one or more of the following information: time domain information, frequency domain information, and polarization domain information; and a transceiver unit, configured to send the first offset.

With reference to the ninth aspect, in a possible implementation, the first offset is an offset relative to a reference domain information identifier or the reference domain information.

With reference to the ninth aspect, in a possible implementation, the reference domain information is domain information sent by the transceiver unit at a reference moment.

With reference to the ninth aspect, in a possible implementation, the domain information is carried in a bandwidth part BWP information element.

With reference to the ninth aspect, in a possible implementation, the transceiver unit further sends a second offset, where the second offset is different from the first offset, and the second offset indicates an offset of domain information of at least one beam other than the plurality of beams relative to reference domain information of the at least one beam.

With reference to the ninth aspect, in a possible implementation, the transceiver unit is further configured to send a domain information identifier, where the domain information identifier indicates the domain information of the plurality of beams.

With reference to the ninth aspect, in a possible implementation, the transceiver unit is further configured to send a reference multiplexing information identifier and a reference multiplexing information identifier change value, where the reference multiplexing information identifier change value indicates a value of a changed reference multiplexing information identifier.

With reference to the ninth aspect, in a possible implementation, the time domain information includes a frame, a subframe, a slot, a mini-slot, or a symbol.

With reference to the ninth aspect, in a possible implementation, the frequency domain information includes a frequency or a frequency channel number.

With reference to the ninth aspect, in a possible implementation, the polarization domain information includes at least one of left hand circular polarization LHCP and right hand circular polarization RHCP.

With reference to the ninth aspect, in a possible implementation, the processing unit is further configured to periodically update beam information, where the beam information includes at least one of the reference domain information, the first offset, and a quantity of beams.

With reference to the ninth aspect, in a possible implementation, reference domain information of the plurality of beams in a current period is different from reference domain information of the plurality of beams in a period before the current period. Alternatively, a value range of the first offset of the plurality of beams in a current period is different from that in a period before the current period. Alternatively, a quantity of beams in a current period is different from that in a period before the current period.

With reference to the ninth aspect, in a possible implementation, the transceiver unit is further configured to receive a request of a terminal device, and send the reference domain information to the terminal device.

With reference to the ninth aspect, in a possible implementation, the first offset is carried in a system information block SIB, and the transceiver unit is further configured to send the SIB by broadcasting.

The network device provided in this application is further configured to perform the method according to any possible implementation of the third aspect. For example, the transceiver unit is configured to obtain location information of another communication apparatus.

The processing unit is configured to determine a coverage area of the third communication apparatus based on location information of the third communication apparatus and the location information of the another communication apparatus.

The processing unit is further configured to determine, based on whether a center point of a beam is in the coverage area of the third communication apparatus, to enable or disable the beam.

With reference to the foregoing third aspect, in a possible implementation, the coverage area is determined based on a Voronoi diagram. Optionally, the Voronoi diagram is two-dimensional or three-dimensional.

With reference to the third aspect, in a possible implementation, if duration is greater than a preset value, or a location change between the third communication apparatus and the another communication apparatus is greater than a preset value, the processing unit updates the Voronoi diagram.

With reference to the foregoing third aspect, in a possible implementation, the transceiver unit sends beam enabling/disabling information to the another communication apparatus, where the beam enabling/disabling information is an endpoint location or an offset of an expanded or shrunk Voronoi diagram. The offset indicates an offset of the expanded or shrunk Voronoi diagram relative to the Voronoi diagram before expansion or shrinkage.

With reference to the third aspect, in a possible implementation, the beam enabling/disabling information is carried in an XnAP message.

For example, the beam enabling/disabling information is carried in a CoveragePattern information element in the XnAP message.

The network device provided in this application is further configured to perform the method according to any possible implementation of the fifth aspect. For example, the processing unit is configured to determine domain information identifiers of a plurality of beams, where the domain information identifiers indicate domain information of the plurality of beams, and the domain information includes one or more of the following information: time domain information, frequency domain information, and polarization domain information. The transceiver unit is configured to send the domain information identifiers of the plurality of beams.

The network device provided in this application is further configured to perform the method according to any possible implementation of the seventh aspect. For example, the transceiver unit is configured to obtain domain information identifiers of a plurality of beams, where the domain information identifiers indicate domain information of the plurality of beams, and the domain information includes one or more of the following information: time domain information, frequency domain information, and polarization domain information. The processing unit is configured to separately update the domain information of the plurality of beams based on the domain information identifiers.

It should be noted that, for beneficial effects of the implementations of the network device provided in the ninth aspect of embodiments of this application, refer to beneficial effects of any one of the second aspect, the third aspect, the fifth aspect, the seventh aspect, and the possible implementations of the second aspect, the third aspect, the fifth aspect, and the seventh aspect. Details are not described herein again.

According to a tenth aspect, this application provides a communication apparatus. The communication apparatus includes a logic circuit and an input/output interface. The input/output interface is configured to input or output a signal or data. The logic circuit is configured to perform the method according to any one of the first aspect and the possible implementations of the first aspect, any one of the fourth aspect and the possible implementations of the fourth aspect, and any one of the sixth aspect and the possible implementations of the sixth aspect.

According to an eleventh aspect, this application provides a communication apparatus. The communication apparatus includes a logic circuit and an input/output interface. The input/output interface is configured to input or output a signal or data. The logic circuit is configured to perform the method according to any one of the second aspect and the possible implementations of the second aspect, any one of the third aspect and the possible implementations of the third aspect, any one of the fifth aspect and the possible implementations of the fifth aspect, and any one of the seventh aspect and the possible implementations of the seventh aspect.

According to a twelfth aspect, this application provides a communication apparatus. The communication apparatus includes a processor, configured to execute a computer program. When the computer program is executed, the communication apparatus is enabled to perform the method according to any one of the first aspect and the possible implementations of the first aspect, any one of the fourth aspect and the possible implementations of the fourth aspect, and any one of the sixth aspect and the possible implementations of the sixth aspect.

With reference to the twelfth aspect, in a possible implementation, the communication apparatus further includes a memory, and the memory is configured to store a computer program.

With reference to the twelfth aspect, in a possible implementation, the processor and the memory are integrated together.

With reference to the twelfth aspect, in a possible implementation, the memory is located outside the apparatus.

With reference to the twelfth aspect, in a possible implementation, the communication apparatus further includes a transceiver, and the transceiver is configured to send or receive data and/or a signal.

According to a thirteenth aspect, this application provides a communication apparatus. The communication apparatus includes a processor, configured to execute a computer program. When the computer program is executed, the apparatus is enabled to perform the method according to any one of the second aspect and the possible implementations of the second aspect, any one of the third aspect and the possible implementations of the third aspect, any one of the fifth aspect and the possible implementations of the fifth aspect, and any one of the seventh aspect and the possible implementations of the seventh aspect.

With reference to the thirteenth aspect, in a possible implementation, the communication apparatus further includes a memory, and the memory is configured to store a computer program.

With reference to the thirteenth aspect, in a possible implementation, the processor and the memory are integrated together.

With reference to the thirteenth aspect, in a possible implementation, the memory is located outside the apparatus.

With reference to the thirteenth aspect, in a possible implementation, the communication apparatus further includes a transceiver, and the transceiver is configured to send or receive data and/or a signal.

According to a fourteenth aspect, this application provides a computer-readable storage medium. The computer-readable storage medium stores a computer program. The computer program is executed by a processor, so that some or all of the steps of the method according to any one of the first aspect to the seventh aspect and the possible implementations of the first aspect to the seventh aspect are performed.

According to a fifteenth aspect, this application provides a computer program product including executable instructions. When the computer program product runs on a terminal device, some or all of the steps of the method according to any one of the first aspect to the seventh aspect and the possible implementations of the first aspect to the seventh aspect are performed.

According to a sixteenth aspect, this application further provides a chip system. The chip system includes a processor, and may further include a memory, to implement the method according to any one of the first aspect to the seventh aspect and the possible implementations of the first aspect to the seventh aspect. The chip system may include a chip, or may include a chip and another discrete device.

According to a seventeenth aspect, this application further provides a communication system. The communication system includes a terminal device and a network device. The terminal device is configured to perform any one of the first aspect and the possible implementations of the first aspect, any one of the fourth aspect and the possible implementations of the fourth aspect, and any one of the sixth aspect and the possible implementations of the sixth aspect. The network device is configured to perform any one of the second aspect and the possible implementations of the second aspect, any one of the third aspect and the possible implementations of the third aspect, any one of the fifth aspect and the possible implementations of the fifth aspect, and any one of the seventh aspect and the possible implementations of the seventh aspect.

BRIEF DESCRIPTION OF DRAWINGS

To describe the technical solutions in embodiments of the present disclosure or in the background more clearly, the following briefly describes the accompanying drawings for describing embodiments of the present disclosure or the background.

DESCRIPTION OF EMBODIMENTS

The following describes embodiments of the present disclosure with reference to the accompanying drawings in embodiments of the present disclosure. Terms used in embodiments of the present disclosure are merely intended to explain specific embodiments of the present disclosure, and are not intended to limit the present disclosure.

Figure 1:
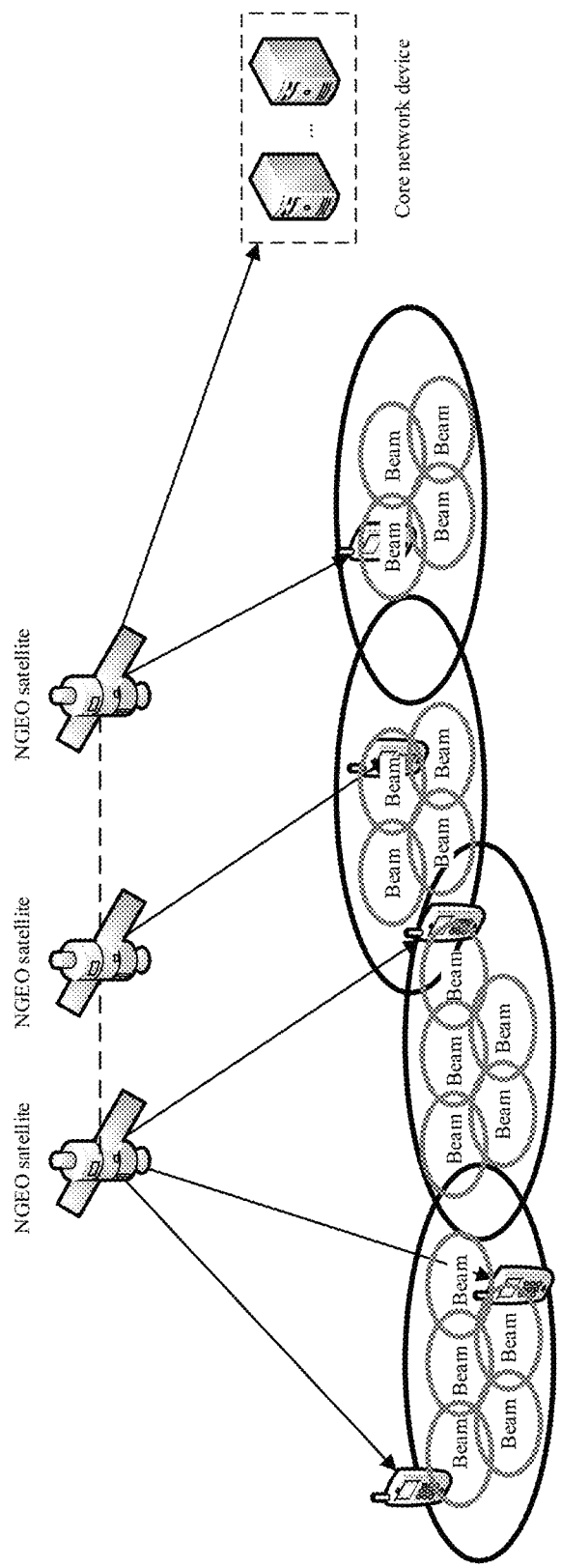
FIG. 1 is a schematic diagram of an architecture of a satellite communication system according to an embodiment of the present disclosure.

FIG. 1 shows a satellite communication system according to an embodiment of the present disclosure. The satellite communication system includes a user equipment (UE) and a network device. The network device may include one or more satellite nodes (for example, may be an NGEO satellite) and a core network device. The UE may perform wireless communication with the satellite nodes, and the satellite node may perform wireless communication with the core network device.

The satellite node may include an orbit receiver or a relay configured to relay information. The satellite node may perform communication interaction with the core network device, and provide a communication service for the UE.

The core network device is, for example, a device in a core network (CN) in an existing mobile communication architecture (for example, a 3GPP access architecture of a 5G network) or a device in a core network in a future mobile communication architecture. As a bearer network, the core network provides an interface to a data network, provides communication connection, authentication, management, and policy control for the user equipment (UE), bears data services, and the like. The CN may further include network elements such as an access and mobility management network element (AMF), a session management network element (SMF), an authentication server network element (Authentication Server Function, AUSF), a policy control node (Policy Control Function, PCF), and a user plane function (UPF) network element. The AMF network element is configured to manage access and mobility of the UE, and is mainly responsible for functions such as UE authentication, UE mobility management, and UE paging.

The UE may be any one of a terminal device (terminal equipment), a communication device, or an interne of things (IoT) device. The terminal device may be a smartphone, a cellular phone, a smartwatch, a smart tablet, a personal digital assistant computer, a laptop computer, or the like. The communication device may be a server, a gateway (GW), a controller, a wireless modem, or the like. The IoT device may be a sensor, a mobile apparatus (such as a bicycle/car/vehicle), or the like.

Similarly, embodiments of the present disclosure may also be applied to a terrestrial communication system. For example, the communication system may be a 3rd generation partnership project (3GPP) communication system, for example, a long term evolution (LTE) system, or may be a 5G mobile communication system, a new radio (NR) system, or a future communication system. This is not limited in this application. The network device may include but is not limited to: an evolved nodeB (eNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a gNB, a TRP, or a TP in the 5G system, or one or a group of antenna panels (including a plurality of antenna panels) of a base station in the 5G system. In addition, the network device may alternatively be a network node included in a gNB or a TP, for example, a BBU or a distributed unit (DU). Alternatively, the network device may be a device responsible for a network side function in a device-to-device (D2D) communication system, a machine-to-machine (M2M) communication system, an Internet of Things (IoT) communication system, an Internet of Vehicles communication system, or another communication system.

It should be further noted that, for brevity of the specification, this specification mainly describes the technical solution based on the satellite communication system shown in FIG. 1.

The following briefly describes satellite beam interference management in this application.

In a satellite communication system, to improve a system capacity, a satellite is usually equipped with a large-scale antenna array system, and forms a plurality of beams at the same time to provide transmission for different users. In a multi-beam satellite communication system, a near-far effect is not obvious, and user signal strength at a cell center and user signal strength at a cell edge vary slightly. Therefore, if a full-frequency multiplexing mode of an existing terrestrial LTE or 5G system is used, strong inter-beam interference and inter-satellite interference are generated. In a satellite network, interference is reduced by using a frequency and polarization multiplexing mode.

Figure 2:
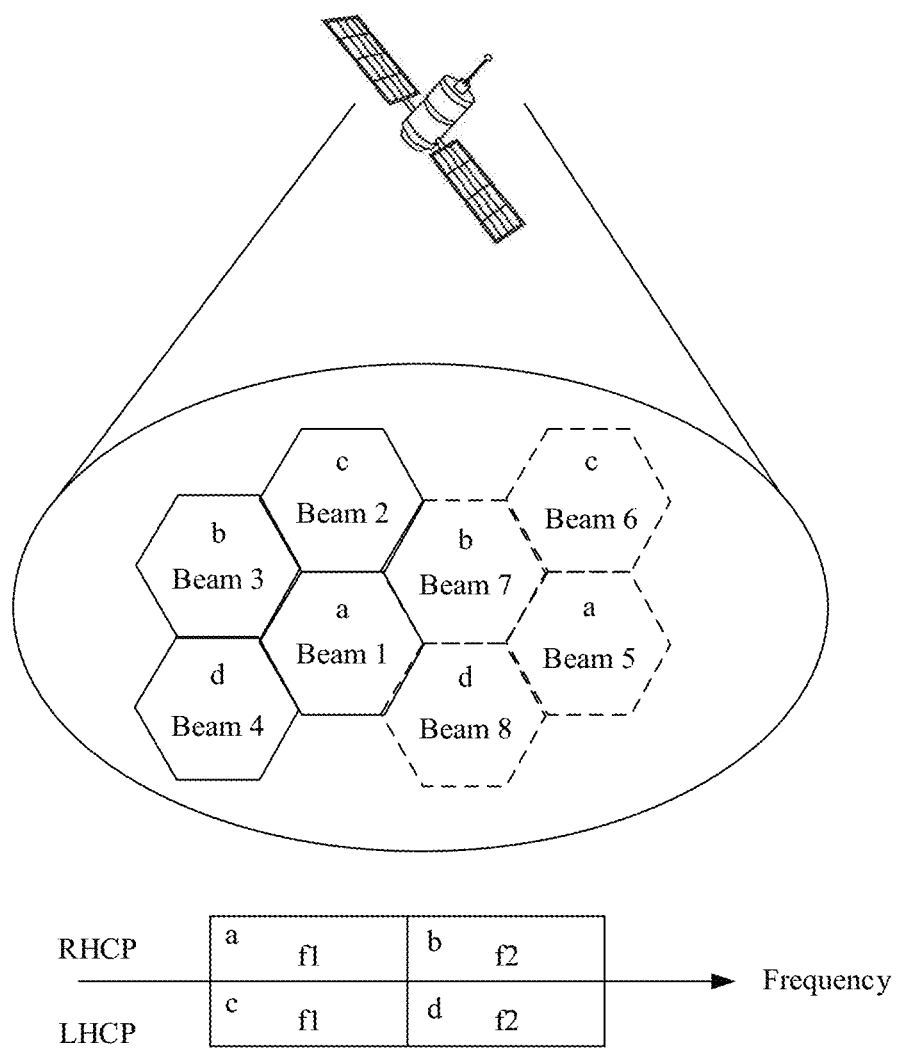
FIG. 2 is a schematic diagram of a common multiplexing solution in satellite communication in the conventional technology.

FIG. 2 shows a common multi-color multiplexing solution in satellite communication (a plurality of colors are represented as a, b, c, and d in the figure). One color represents a combination of a frequency and a polarization mode. In the multi-color multiplexing solution, a color multiplexing order $N=i^2+j^2+i*j$, where i and j are positive integers. FIG. 2 shows four-color multiplexing. To be specific, N=4, which corresponds to four combinations of frequencies and polarization modes. Specifically, both a beam 1 and a beam 5 use a frequency f1 and an RHCP polarization mode, and a combination of f1 and RHCP corresponds to a color a. Both a beam 2 and a beam 6 use the frequency f1 and an LHCP polarization mode, and a combination of f1 and LHCP corresponds to a color c. Both a beam 3 and a beam 7 use a frequency f2 and the RHCP polarization mode, and a combination of f2 and RHCP corresponds to a color b. Both a beam 4 and a beam 8 use the frequency f2 and the LHCP polarization mode, and a combination of f2 and LHCP corresponds to a color d.

The color multiplexing solution is further described by using color multiplexing solution information delivered by a 61-beam satellite system as an example. Table 1 shows color information corresponding to each beam at each moment, and the color information indicates a frequency and a polarization mode.

TABLE 1

| Time | Beam identifier | Color information |
| --- | --- | --- |
| Moment 1 | Beam 1 | Frequency + polarization A1 |
|  | Beam 2 | Frequency + polarization A2 |
|  | ... |  |
|  | Beam 61 | Frequency + polarization A61 |
| Moment 2 | Beam 1 | Frequency + polarization B1 |
|  | Beam 2 | Frequency + polarization B2 |
|  | ... |  |
|  | Beam 61 | Frequency + polarization B61 |
| ... | ... | ... |
| Moment t | Beam 1 | Frequency + polarization C1 |
|  | Beam 2 | Frequency + polarization C2 |
|  | ... |  |
|  | Beam 61 | Frequency + polarization C61 |

A satellite delivers frequency and/or polarization solutions of all beams at each moment according to information in Table 1, or delivers frequency and polarization solutions of all beams in a subsequent period of time at a moment, and signaling overheads are high.

In view of a problem in a satellite communication color multiplexing solution in the conventional technology, this application provides a beam information indication method. According to the method, signaling overheads can be reduced while implementing beam color multiplexing. Specifically, in the beam information indication method provided in this application, a first offset is introduced to indicate offsets of domain information of a plurality of beams relative to reference domain information of the plurality of beams. The domain information of the plurality of beams may be updated by using the reference domain information of the plurality of beams and the first offset.

It should be noted that, when embodiments of this application are applied to the field of satellite communication, the domain information of the beams in embodiments of this application may be correspondingly understood as color information in a color multiplexing solution in satellite communication, and the reference domain information of the beams may be understood as reference color information. The two may be interchanged in the following description. A unified description is provided herein, and details are not described below again.

Specifically, the following describes embodiments of this application with reference to the accompanying drawings.

Figure 3A:
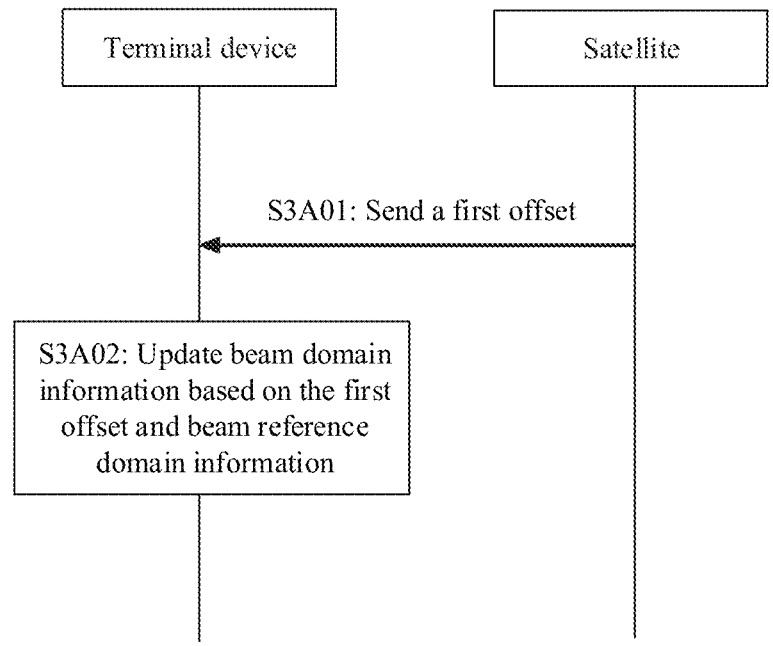
FIG. 3A is a schematic diagram of a beam information indication method in satellite communication according to an embodiment of the present disclosure.

As shown in FIG. 3A, a beam information indication method provided in this application includes the following steps.

S3A01: A first communication apparatus obtains a first offset.

The first communication apparatus receives the first offset sent by a second communication apparatus, where the first offset indicates an offset of domain information of a plurality of beams relative to reference domain information of the plurality of beams. The domain information of the beams includes one or more of the following: time domain information, frequency domain information, and polarization domain information.

It should be understood that the method provided in this embodiment of this application may be applied to a wireless communication system and a satellite communication system.

For example, the first communication apparatus may be a terminal device or a chip, and the second communication apparatus may be a network device or a chip. The network device is, for example, a satellite. The following uses an example in which the first communication apparatus is a terminal device and the second communication apparatus is a satellite for description.

In an implementation, the satellite sends, at an initial moment or a reference moment, the reference domain information and a first offset corresponding to each moment in a subsequent period of time. Correspondingly, the terminal device receives the reference domain information delivered by the satellite and the first offset corresponding to each moment in the subsequent period of time.

In another implementation, the satellite sends the reference domain information at an initial moment or a reference moment, and sends, at the initial moment or at each moment after the reference moment, a first offset corresponding to the current moment. Correspondingly, the terminal device receives the reference domain information at the initial moment or a reference moment, and correspondingly receives, at the initial moment or each moment after the reference moment, the first offset sent by the satellite.

It should be understood that the reference domain information of the beams may be considered as domain information obtained by the terminal device at the initial moment or the reference moment, or may be domain information determined before the current moment. For example, domain information at a specific moment is determined based on the reference domain information obtained at the initial moment or the reference moment and the first offset. The domain information may be considered as reference domain information corresponding to a next moment of the specific moment. The initial moment may be a moment at which the satellite starts communication, and the reference moment may be a specified moment. The moment before the current moment may be a previous moment of the current moment, or any moment before the current moment.

Optionally, the terminal device may alternatively obtain the reference domain information and/or the first offset from another terminal device. For example, in a device to device (D2D) scenario, information transmission is implemented by using a sidelink (SL). This is not limited in this application.

In a possible implementation, the time domain information includes a frame, a subframe, a slot, a mini-slot, or a symbol, the frequency domain information includes a frequency or a frequency channel number, and the polarization domain information includes at least one of an LHCP and an RHCP.

It should be noted that "moment" mentioned in this application is a time concept, and specifically refers to a time point t1 or a time period Δt. The time domain information is information related to a time domain resource, for example, a frame, a subframe, a slot, a mini-slot, or symbol information.

In an implementation, the first offset is an offset relative to a reference domain information identifier. Specifically, the first offset is a first offset identifier. A value range of the reference domain information identifier is the same as a value range of the first offset. The value range of the reference domain information identifier may be correspondingly understood as a color order in a color multiplexing solution. For example, a color order corresponding to four-color multiplexing is 4. To be specific, the value range of the reference domain information identifier/first offset identifier is 4, and may be represented by two bits, for example, 00, 01, 10, and 11. In this embodiment, the reference domain information identifier may also be referred to as a reference domain information index, and the first offset identifier may also be referred to as a first offset index.

For example, Table 2 shows an identifier corresponding to each type of color multiplexing information in the four-color multiplexing solution. In this example, the color multiplexing information is a combination of a frequency and a polarization mode. Specifically, an identifier 00 indicates a combination of a frequency f1 and an LHCP polarization mode, an identifier 01 indicates a combination of the frequency f1 and an RHCP polarization mode, an identifier 10 indicates a combination of a frequency f2 and the LHCP polarization mode, and an identifier 11 indicates a combination of the frequency f2 and the RHCP polarization mode. The four-color multiplexing is a combination of multiplexing the four frequencies and polarization modes by a plurality of beams.

For another example, color multiplexing information provided in Table 3 is frequencies. In this case, polarization modes are not distinguished. Identifiers 00, 01, 10, and 11 correspond to different frequencies f1, f2, f3, and f4 respectively.

For another example, color multiplexing information shown in Table 4 is slots and frequencies, and identifiers 00, 01, 10, and 11 respectively correspond to different slot and frequency combinations t1 and f1, t2 and f2, t3 and f3, and t4 and f4.

It should be noted that Table 2, Table 3, and Table 4 are merely examples for description, and do not constitute a limitation on the solution of this application. For example, not only the four-color multiplexing is used, but also multi-color multiplexing may be used. In other words, there are not only four combinations of frequencies and polarization modes, there may be a plurality of combinations, and the color multiplexing information may also be frequencies.

TABLE 2

| Identifier | Color multiplexing information |
|---|---|
| 00 | Frequency f1 and LHCP |
| 01 | Frequency f1 and RHCP |
| 10 | Frequency f2 and LHCP |
| 11 | Frequency f2 and RHCP |

TABLE 3

| Identifier | Color multiplexing information |
|---|---|
| 00 | Frequency f1 |
| 01 | Frequency f2 |
| 10 | Frequency f3 |
| 11 | Frequency f4 |

TABLE 4

| Identifier | Color multiplexing information |
|---|---|
| 00 | Slot t1 and frequency f1 |
| 01 | Slot t2 and frequency f2 |
| 10 | Slot t3 and frequency f3 |
| 11 | Slot t4 and frequency f4 |

It should be understood that the color multiplexing information is color information multiplexed by a satellite beam, namely, domain information multiplexed by a beam in this application. A 61-beam satellite system is used as an example, for example, 61 beams multiplex four color information shown in Table 2. Reference color information is beam color information corresponding to all beams after the beams multiplex the color multiplexing information, for example, as shown in Table 5.

In a possible implementation, a mapping relationship table between color multiplexing information and an identifier may be included in the beam reference domain information, and is delivered together with or separately delivered from the beam reference domain information. Specifically, when the color multiplexing solution changes, for example, the color multiplexing information changes or the color multiplexing order changes, the mapping relationship table between the color multiplexing information and the identifier is updated.

Optionally, the mapping relationship table between the color multiplexing information and the identifier may alternatively be preconfigured for the terminal device. Specific information corresponding to a beam reference domain information identifier may be obtained according to the preconfigured mapping relationship table between the color multiplexing information and the identifier.

For example, the reference domain information identifier is offset based on the first offset. A new domain information identifier is obtained by offsetting the reference domain information identifier based on the first offset, and a value of the new domain information identifier falls within a value range of the identifier corresponding to the color multiplexing information. This implements color information multiplexing.

Optionally, the new domain information identifier may be obtained by using a method of adding the first offset and the reference domain information identifier and then performing a modulo operation on a color order.

Specifically, the four-color multiplexing solution of the 61-beam satellite system shown in Table 5 is used as an example for description. The reference domain information is provided in a form of an identifier of the reference domain information, and color multiplexing information corresponding to each identifier is, for example, shown in Table 2. As shown in Table 5, a moment 1 corresponds to reference domain information of 61 beams, and a moment 2 corresponds to an offset 01. The offset 01 indicates that an offset of 01 is performed on identifiers of the reference domain information of the 61 beams at the moment 2, to obtain domain information identifiers of the 61 beams at the moment 2. For example, if a reference domain information identifier of a beam 2 is 11, and the offset corresponding to the moment 2 is 01, a domain information identifier corresponding to a beam 1 at the moment 2 is mod(11+01, 4)=00, where mod( ) represents a modulo operation, and 4 represents a color order in the color multiplexing solution. To be specific, at the moment 2, the domain information corresponding to the beam 2 is color multiplexing information corresponding to an identifier 00, for example, the combination of the frequency f1 and the LHCP polarization mode in Table 2. Similarly, if the domain information identifier corresponding to the beam 2 at the moment t is mod(11+11, 4)=10, the domain information corresponding to the beam 2 at the moment t is the combination of the frequency f2 and the LHCP polarization mode. For another example, if color multiplexing information corresponding to each identifier in Table 5 is the slot and frequency information shown in Table 4, similarly, the moment 2 corresponds to the offset 01, a new domain information identifier obtained through offset of the beam 1 is 01. In other words, the beam 1 is correspondingly transmitted in the slot t2 and the frequency f2 at the moment 2.

TABLE 5

| Moment 1 | Beam 1: 00 |
| (Reference color information/ | Beam 2: 11 |
| reference domain information) | ... |
|  | Beam 61: 10 |
| Moment 2 | Offset: 01 |
| ... | ... |
| Moment t | Offset: 11 |

Figure 3B:
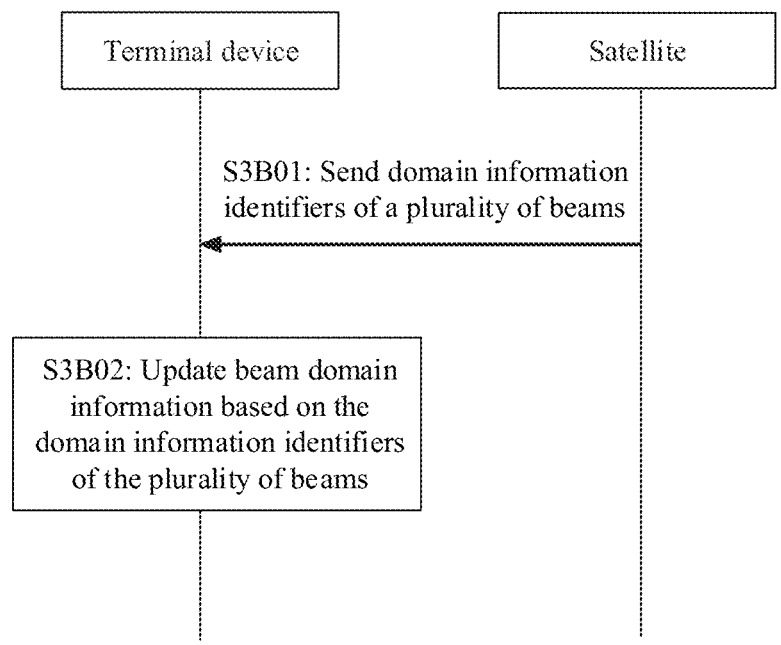
FIG. 3B is a schematic diagram of another beam information indication method in satellite communication according to an embodiment of the present disclosure.

In another possible implementation, as shown in FIG. 3B, the following steps may be performed to update beam domain information.

S3B01: The satellite may directly send domain information identifiers corresponding to the plurality of beams, in other words, the satellite notifies the terminal device of the domain information identifiers corresponding to all the beams, instead of using a manner of sending the domain information identifiers corresponding to all the beams at the reference moment and sending an offset relative to the reference domain information at another moment in the foregoing embodiment. Several beams correspond to a same domain information identifier at a previous moment of a current moment, and the several beams still have a same domain information identifier at the current moment. Optionally, the domain information identifier of the several beams at the current moment is the same as or different from the domain information identifier corresponding to the several beams at the current moment.

Correspondingly, the terminal device receives the domain information identifiers corresponding to the plurality of beams sent by the satellite.

Optionally, the satellite separately sends, at each moment, a domain information identifier corresponding to a beam, or delivers, at a moment, domain information identifiers of all beams in a subsequent period of time.

S3B02: The terminal device updates the beam domain information based on the domain information identifiers of the plurality of beams.

For example, as shown in Table 6, at a moment 1, the satellite delivers domain information identifiers corresponding to 61 beams, where domain information identifiers corresponding to a beam 1 and a beam 58 are the same. Similarly, domain information identifiers corresponding to beams 2 to 4 and domain information identifiers corresponding to beams 59 to 61 are also the same. At a moment 2, the satellite delivers updated domain information identifiers corresponding to the 61 beams. Beam domain information identifiers corresponding to beams 1 to 4 and beam domain information identifiers corresponding to beams 58 to 61 are the same, but are different from corresponding domain information identifiers at the moment 1. Specifically, domain information corresponding to a domain information identifier may be, for example, obtained from the mapping relationship table between the color multiplexing information and the identifier in Table 2.

Based on the foregoing embodiment, the satellite delivers an updated beam domain information identifier at each moment or delivers an identifier of beam domain information in a subsequent period of time at a reference moment. This reduces signaling overheads compared with directly delivering beam domain information.

TABLE 6

| Moment 1 | Beam 1: 00 |
|  | Beam 2: 01 |
|  | Beam 3: 10 |
|  | Beam 4: 11 |
|  | ... |
|  | Beam 58: 00 |
|  | Beam 59: 01 |
|  | Beam 60: 10 |
|  | Beam 61: 11 |
| Moment 2 | Beam 1: 10 |
|  | Beam 2: 11 |
|  | Beam 3: 00 |
|  | Beam 4: 01 |
|  | ... |
|  | Beam 58: 10 |
|  | Beam 59: 11 |
|  | Beam 60: 00 |
|  | Beam 61: 01 |
| Moment t | Beam 1: 11 |
|  | Beam 2: 01 |
|  | Beam 3: 10 |
|  | Beam 4: 00 |
|  | ... |
|  | Beam 58: 11 |
|  | Beam 59: 01 |

TABLE 6-continued

Beam 60: 10
Beam 61: 00

Figure 3C:
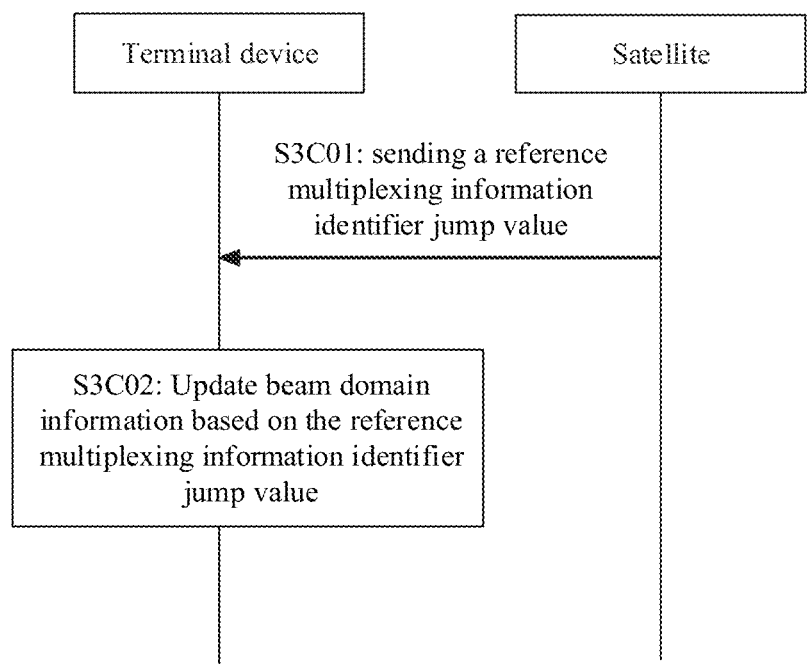
FIG. 3C is a schematic diagram of still another beam information indication method in satellite communication according to an embodiment of the present disclosure.

In still another possible implementation, as shown in FIG. 3C, the following steps may be performed to update beam domain information.

S3C01: The satellite sends a reference multiplexing information identifier change value, where the reference multiplexing information identifier change value indicates a changed reference multiplexing information identifier.

Correspondingly, the terminal device receives the reference multiplexing information identifier change value.

It should be noted that the reference multiplexing information may be understood as, for example, color multiplexing information shown in Table 2 to Table 4. Reference multiplexing information identifier may be a multiplexing information identifier corresponding to a reference moment or an initial moment, or may be a multiplexing information identifier corresponding to a current moment. The initial moment may be a moment at which the satellite starts communication, and the reference moment may be a specified moment. The moment before the current moment may be a previous moment of the current moment, or any moment before the current moment.

S3C02: The terminal device updates the beam domain information at each moment based on the reference multiplexing information identifier change value.

For example, the four-color multiplexing solution is used as an example for description. Table 2 is used as an example of specific color multiplexing information indicated by identifiers in Table 7. The satellite sends an identifier change corresponding to each moment after the reference moment, to update the beam domain information. For example, at a moment 2, the satellite sends a changed value of an identifier relative to the reference moment. For example, an identifier 00 at a moment 1 changes to an identifier 01 at the moment 2, and an identifier 01 at the moment 1 changes to an identifier 10 at the moment 2. It should be noted that color multiplexing information indicated by an identifier itself may not change. The 61 beam system is used as an example. To be specific, a beam of color information corresponding to the identifier 00 is multiplexed at the moment 1, and color information corresponding to the identifier 01 is multiplexed at the moment 2.

TABLE 7

| Moment 1 (reference moment) | Moment 2 | . . . | Moment t |
|---|---|---|---|
| 00 | 01 | . . . | 11 |
| 01 | 10 | . . . | 10 |
| 10 | 11 | . . . | 00 |
| 11 | 00 | . . . | 01 |

In the foregoing embodiment, an identifier is set for the color multiplexing information. When delivering the beam domain information, the satellite may directly deliver an identifier corresponding to each beam, and the identifier indicates specific corresponding color multiplexing information. This reduces signaling overheads compared with the conventional technology in which color multiplexing information is directly delivered. Specifically, Table 1, Table 6, and Table 7 are used as an example for description. Table 1 is a manner of delivering beam domain information in an existing technical solution. Specific beam domain information is delivered at each moment. For example, frequency information is 2 bits, and may represent three or four different frequencies. Polarization information is 1 bit, and may represent a polarization mode such as LHCP or RHCP. An overhead required for updating 61 pieces of beam domain information at each moment is 61*(2+1)=183 bits. Table 6 shows that the domain information corresponding to each moment is updated in a form of a beam domain information identifier, and required overheads are 61*2=122 bits. Compared with the existing technical solution, updating the domain information corresponding to each moment in the form of the beam domain information identifier reduces signaling overheads to some extent, and can also implement multiplexing of color information. In Table 7, a value of a changed reference multiplexing information identifier at each moment is sent. In this way, beams that have a same reference multiplexing information identifier before the current moment have a unified reference multiplexing information identifier change at the current moment, to update the beam domain information. An overhead required for updating the reference multiplexing information identifier at each moment is 16 bits, to further reduce signaling overheads. Further, indicating to update the beam domain information by using the first offset can greatly reduce signaling overheads while implementing color information multiplexing. Table 5 is used as an example. After the satellite delivers the reference domain information (the reference domain information is delivered by using an identifier corresponding to the reference domain information), the satellite may deliver a first offset corresponding to each moment within a period of time or deliver a first offset corresponding to a current moment at each moment. Offset is performed on the reference domain information identifier as a whole by using the first offset. At each moment after the reference moment, only 2 bits of overheads are required to update all beam domain information. Signaling overheads are greatly reduced, especially for a large-scale beam system (of hundreds or even thousands of beams). In addition, same offset is performed on several beams corresponding to same color multiplexing information, to ensure that the several beams still have same color multiplexing information after the offset, and the several beams are spaced at a same distance from the beams before the offset. This effectively resolves beam interference caused by a small difference between signal strength of a cell center user and that of a cell edge user in satellite communication.

In another possible implementation, the first offset may be an offset relative to the reference domain information. The first offset is specifically an offset, for example, an offset relative to a frequency or a frequency channel number, or an offset relative to a frame, a subframe, a slot, a mini-slot, or a symbol. This is not limited in this application. The first offset directly performs offset on the reference domain information, to reduce calculation complexity.

In a possible implementation, the terminal device obtains a second offset, where the second offset is different from the first offset, and the second offset indicates an offset of domain information of at least one beam other than the plurality of beams relative to reference domain information of the at least one beam. In other words, the terminal device may receive the first offset and the second offset, where the first offset corresponds to a part of beams of all beams supported by the terminal device, and the second offset corresponds to another part of beams of all beams supported by the terminal device.

For example, in Table 8, a first offset corresponding to beams 1 to 40 at a moment 2 is 01, a second offset corresponding to beams 41 to 61 at the moment 2 is 10, a first offset corresponding to the beams 1 to 40 at a moment t is 11, and a second offset corresponding to the beams 41 to 61 at the moment t is 00.

TABLE 8

| | |
|---|---|
| Moment 1 (Reference color information/ reference domain information) | Beam 1: 00 Beam 2: 11 . . . Beam 61: 10 |
| Moment 2 | First offset: 01 Second offset: 10 |
| . . . | . . . |
| Moment t | First offset: 11 Second offset: 00 |

In the foregoing embodiment, the first offset and the second offset indicate offsets of all beam domain information. This embodiment is applicable to a beam hopping satellite system. Different clusters of beams correspond to respective offsets. This helps reduce beam interference between different clusters of beams, and can reduce signaling overheads in a beam domain information update process.

Similarly, the first offset and the second offset may be offset identifiers or specific offsets.

It should be noted that the foregoing embodiment is merely an example but not a limitation. There are a plurality of beam combinations corresponding to the first offset and the second offset. Details are not described herein in this application.

In addition, the first offset and the second offset are merely examples. More offsets may be set for a quantity of beams supported by the terminal device.

In a possible implementation, beam domain information is carried in a bandwidth part BWP information element. It may also be understood that BWP configuration information carries the beam domain information. Optionally, each type of domain information corresponds to one BWP configuration. For example, in a four-color multiplexing solution, four types of color multiplexing information respectively correspond to configuration information of a BWP 0, a BWP 1, a BWP 2, and a BWP 3.

Optionally, an identifier of the beam domain information carried in the BWP information element may be an identifier included in the BWP configuration information, or may be an identifier reset for each piece of beam domain information. For setting of the identifier, refer to the foregoing embodiment. Details are not described herein again.

Optionally, the BWP information element may carry specific beam domain information, for example, carry one or a combination of time domain information, frequency domain information, and polarization domain information of a beam.

For example, as shown in Table 9, in the four-color multiplexing solution, 00, 01, 10, and 11 are identifiers respectively corresponding to a BWP 0, a BWP 1, a BWP 2, and a BWP 3. As shown in Table 10, each group of beams multiplex one piece of BWP configuration information. For example, beams 1 to 10 use configuration information of the BWP 0, beams 53 to 61 use configuration information of the BWP 3, and the BWP 0 to the BWP 3 correspond to a same offset at each moment. For example, an offset at a moment 2 is 01, and a new identifier 01 is obtained after an offset of 01 is performed on the beams 1 to 10. In other words, at the moment 2, the beams 1 to 10 multiplex configuration information of the BWP 1.

TABLE 9

| Identifier | Color multiplexing information |
|---|---|
| 00 | BWP 0 |
| 01 | BWP 1 |
| 10 | BWP 2 |
| 11 | BWP 3 |

TABLE 10

| | |
|---|---|
| Moment 1 (Reference color information/ reference domain information) | BWP 0: beam 1 to beam 10 BWP 1: beam 11 to beam 30 BWP 2: beam 41 to beam 52 BWP 3: beam 53 to beam 61 |
| Moment 2 | Offset: 01 |
| . . . | . . . |
| Moment t | Offset: 11 |

Optionally, each BWP configuration corresponds to a same offset, or each BWP configuration corresponds to one offset, or at least one BWP other than a plurality of BWP configurations corresponds to a second offset.

Figure 11:
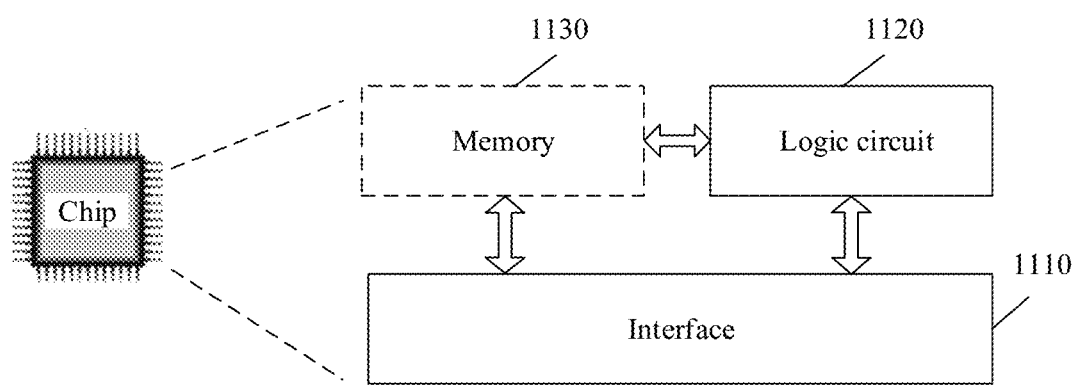
FIG. 11 is a schematic diagram of a structure of yet another apparatus according to an embodiment of the present disclosure.

For example, the BWP 0 and the BWP 1 correspond to the first offset, and the BWP 2 and the BWP 3 correspond to the second offset. Refer to FIG. 11.

TABLE 11

| | |
|---|---|
| Moment 1 (Reference color information/ reference domain information) | BWP 0: beam 1 to beam 10 BWP 1: beam 11 to beam 30 BWP 2: beam 41 to beam 52 BWP 3: beam 53 to beam 61 |
| Moment 2 | First offset: 01 Second offset: 10 |
| . . . | . . . |
| Moment t | First offset: 11 Second offset: 10 |

It should be noted that the 61-beam system in the foregoing embodiment is merely an example. The method provided in this application may be applied to any beam system, for example, a 16-beam system, a 32-beam system, or a 48-beam system. This is not limited in this application.

In a possible implementation, beam information is updated periodically, and the beam information includes at least one of the reference domain information, the first offset, and a quantity of beams. In a possible implementation, reference domain information of a plurality of beams in a current period is the same as reference domain information of the plurality of beams in a period before the current period.

In a possible implementation, reference domain information of a plurality of beams in a current period is different from reference domain information of the plurality of beams in a period before the current period.

In a possible implementation, a value of a first offset of the plurality of beams in the current period is different from a value of the first offset of the plurality of beams in the period before the current period.

In a possible implementation, a value of a first offset of the plurality of beams in the current period is the same as a value of the first offset of the plurality of beams in the period before the current period.

In a possible implementation, a value range of the first offset of the current period is different from a value range of an offset of a period before the current period.

For example, different value ranges of the first offset may be correspondingly understood as that a color multiplexing order changes. For example, the period before the current period is a previous period of the current period, the previous period of the current period uses four-color multiplexing, and the current period uses three-color multiplexing. To be specific, the value range of the first offset of the current period is 3, and may be represented by two bits, for example, 00, 01, 10, and 11. For example, 11 may be reserved, and 00, 01, and 10 indicate three types of color multiplexing information. It should be noted that the foregoing is merely an example, and an identifier may be set and used based on a specific application. This is not limited in this application. A value range of a first offset of the previous period of the current period is 4, for example, 00, 01, 10, and 11. As shown in Table 12, T is a period. In periods t11 to t1T, reference domain information of a beam corresponds to four types of BWP configuration information. This is a four-color multiplexing solution. In periods t21 to t2T, reference domain information of a beam corresponds to three types of BWP configuration information. This is a three-color multiplexing solution.

TABLE 12

| Moment t11 (Reference color information 1/ reference domain information 1) | Multiplexing method 1: four-color multiplexing BWP 0: beam 1 to beam 3 BWP 1: beam 4 to beam 6 BWP 2: beam 7 to beam 9 BWP 3: beam 10 to beam 12 |
|---|---|
| Moment t12 | Offset: 01 |
| . . . | . . . |
| Moment t1T | Offset: 11 |
| Moment t21 (Reference color information 2/ reference domain information 2) | Multiplexing method 2: three-color multiplexing BWP 0: beam 1 to beam 4 BWP 1: beam 5 to beam 8 BWP 2: beam 9 to beam 12 |
| Moment t22 | Offset: 10 |
| . . . | . . . |
| Moment t2T | Offset: 00 |
| . . . | . . . |

Based on the foregoing embodiment, by periodically updating the beam information, a beam color multiplexing solution can be dynamically adjusted based on a specific interference status or a requirement of the terminal device, to effectively perform beam interference management.

It should be noted that a part of rows in the foregoing tables may be used in actual application. In addition, the reference domain information, the offsets, the mapping relationship between the color multiplexing information (frequency and/or polarization mode, BWP, and the like) and the identifier, and the domain information used by the beams in the foregoing tables are merely examples. This is not limited herein in this application. In a possible implementation, a value range of the first offset of the plurality of beams in a current period is the same as a value range of the first offset of the plurality of beams in a period before the current period.

In a possible implementation, a quantity of beams in the current period is different from a quantity of beams in a period before the current period.

For example, when inter-satellite interference is strong, the satellite disables an edge beam, and a quantity of beams changes. Alternatively, when the satellite dynamically adjusts a beam, a quantity of beams changes.

In a possible implementation, a quantity of beams in a current period is the same as a quantity of beams in a period before the current period.

In a possible implementation, reference domain information of the plurality of beams in the current period is the same as reference domain information of the plurality of beams in the period before the current period, and values of a first offset corresponding to the reference domain information of the plurality of beams in the current period are the same as values of a first offset corresponding to the plurality of beams in the period before the current period.

Based on the foregoing embodiment, this helps a terminal device that just accesses a satellite network obtain reference domain information and an offset that are of a beam and that are consistent with those of a terminal device that has accessed the satellite network, to reduce beam interference.

It should be noted that the first offset of the plurality of beams is a first offset corresponding to the reference domain information of the plurality of beams.

In a possible implementation, reference domain information of the plurality of beams in the current period is different from reference domain information of the plurality of beams in the period before the current period, and values of a first offset corresponding to the reference domain information of the plurality of beams in the current period are the same as values of a first offset corresponding to the plurality of beams in the period before the current period.

In a possible implementation, reference domain information of the plurality of beams in the current period is the same as reference domain information of the plurality of beams in the period before the current period, and values of a first offset corresponding to the reference domain information of the plurality of beams in the current period are different from values of a first offset corresponding to the plurality of beams in the period before the current period.

In a possible implementation, reference domain information of the plurality of beams in the current period is different from reference domain information of the plurality of beams in the period before the current period, and values of a first offset corresponding to the reference domain information of the plurality of beams in the current period are different from values of a first offset corresponding to the plurality of beams in the period before the current period.

Based on the foregoing embodiment, color multiplexing information and an offset may be adjusted in a timely manner based on an interference status in a satellite interference monitoring and management process, to implement better interference management.

In a possible implementation, reference domain information of the plurality of beams in the current period is the same as reference domain information of the plurality of beams in the period before the current period, and a quantity of beams in the current period is the same as a quantity of beams in the period before the current period.

For example, inter-satellite interference between satellites in the current period and the period before the current period is small, few beams overlap, and edge beams are not disabled. The quantity of beams in the current period and the quantity of beams in the period before the current period remain unchanged. In addition, when interference monitoring meets a requirement, the reference domain information of the plurality of beams in the current period and the reference domain information of the plurality of beams in the period before the current period may not change.

In a possible implementation, reference domain information of the plurality of beams in the current period is the same as reference domain information of the plurality of beams in the period before the current period, and a quantity of beams in the current period is different from a quantity of beams in the period before the current period.

For example, inter-satellite interference between satellites in the current period and the period before the current period is large, many beams overlap, and a part of edge beams are disabled. The quantity of beams in the current period and the quantity of beams in the period before the current period change.

In a possible implementation, reference domain information of the plurality of beams in the current period is different from reference domain information of the plurality of beams in the period before the current period, and a quantity of beams in the current period is the same as a quantity of beams in the period before the current period.

For example, due to impact of beam interference, the reference domain information of the plurality of beams in the current period may be adjusted, to be different from the reference domain information of the plurality of beams in the period before the current period.

In a possible implementation, reference domain information of the plurality of beams in the current period is different from reference domain information of the plurality of beams in the period before the current period, and a quantity of beams in the current period is different from a quantity of beams in the period before the current period.

For example, due to impact of beam interference, the reference domain information of the plurality of beams in the current period may be adjusted, to be different from the reference domain information of the plurality of beams in the period before the current period. In addition, in consideration of inter-satellite interference, a part of edge beams are disabled, and a quantity of beams changes. Alternatively, a quantity of beams that are of the satellite and that may be specifically included in the current period is different from that in the period before the current period.

It should be understood that the period before the current period may be a previous period of the current period or any period before the current period.

In a possible implementation, if the terminal device does not obtain the reference domain information of the beams within a preset time range, and/or content of the reference domain information of the beams is incorrect, and/or a reference domain information timer of the beams expires, the terminal device requests the reference domain information of the beams from the satellite.

According to this solution, the terminal device requests the reference domain information from the satellite based on a requirement of the terminal device, to ensure that the terminal device obtains accurate reference domain information in a timely manner, and further implements satellite beam interference management based on the obtained reference domain information.

In a possible implementation, the reference domain information of the beams and the first offset are delivered together.

For example, the reference domain information of the beams and the first offset are delivered in a system information block (SIB) message or a radio resource control (RRC) message.

In a possible implementation, the reference domain information of the beams and the first offset are separately delivered.

For example, the reference domain information of the beams is delivered in an RRC message by unicasting, to ensure information accuracy. The first offset is delivered in a SIB message by broadcasting, to effectively reduce signaling overheads.

In a possible implementation, the first offset is carried in an existing information element in a protocol.

For example, the first offset is carried in a BWP information element.

```
-- ASN1STOP -- ASN1START
-- TAG-BWP-START
BWP::=                      SEQUENCE {
   ...
   ShiftFactor              INTEGER (0..N-1)
   TimeInstant
}
-- TAG-BWP-STOP
-- ASN1STOP
```

The shift factor (ShiftFactor) is the first offset, and indicates an offset of domain information of a plurality of beams relative to reference domain information of the plurality of beams. The time instant (TimeInstant) is a moment or a time period, and indicates the satellite to deliver a specific offset at each moment or indicates the satellite to deliver an offset in a future period of time in advance.

Optionally, the first offset may also be carried in another information element such as a common serving cell configuration (servingCellConfigCommon).

In another possible implementation, the first offset is carried in a newly added information element in the SIB message.

For example, the first offset is carried in a color shift pattern (ColorShiftPattern) information element in the SIB message:

```
-- ASN1STOP -- ASN1START
-- TAG-ColorShiftPattern-START
ColorShiftPattern::=        SEQUENCE {
   ShiftFactor              INTEGER (0..N-1)
   TimeInstant
}
-- TAG-ColorShiftPattern-STOP
-- ASN1STOP
```

ShiftFactor is the first offset, and indicates an offset of domain information of a plurality of beams relative to reference domain information of the plurality of beams. TimeInstant is a moment or a time period, and indicates the satellite to deliver a specific offset at each moment or indicates the satellite to deliver an offset in a future period of time in advance.

S3A02: The terminal device updates the domain information of the plurality of beams based on the reference domain information of the plurality of beams and the first offset.

The terminal device obtains the reference domain information of the beams and a first offset corresponding to each moment in a period of time, or after the terminal device obtains the reference domain information of the beams, the terminal device obtains a first offset at a current moment at each moment, to update the beam domain information based on the reference domain information of the beams and the first offset corresponding to each moment. In a satellite beam interference management process, signaling overheads caused by delivering updated beam domain information by the satellite are effectively reduced. Offsets of all beam domain information may be obtained based on the first offset, to update the beam domain information.

The foregoing embodiment is a beam information indication method provided in this application. In a scenario in which a satellite dynamically changes, when the satellite moves near the equator or a satellite spacing between adjacent satellites is large, few beams overlap between satellites, and therefore inter-satellite beam interference is small. By using the beam information indication method provided in this application, signaling overheads caused by beam information update can be effectively reduced. According to the descriptions in the foregoing embodiment, according to the method provided in this application, beam color information multiplexing is implemented. A specific distance exists between beams that multiplex same color information, to effectively reduce beam interference, and further implement satellite beam interference management.

In addition, the beam information indication method provided in this application may be applied to a plurality of scenarios to implement beam interference management. For example, the method provided in this application is used for reducing interference between inter-satellite beams. For example, a serving satellite uses reference color information, and a neighboring satellite uses color information obtained through offset performed on the reference color information based on a first offset. In this way, there is a specific distance between beams that multiplex same color information between the two satellites, and beam interference between the two satellites is reduced. For another example, the satellite uses reference color information at a reference moment t1, and performs offset the reference color information at a moment 2 by using an offset to obtain new color information, to reduce interference between beams of the same satellite.

When the satellite moves from a low-latitude area to a high-latitude area, or when there are a large quantity of satellites, inter-satellite spacing between adjacent satellites is small, an overlapping area between different satellites increases significantly, and inter-satellite interference also increases greatly. This greatly limits network performance.

Based on this, this application further provides an embodiment in which a beam information indication method is combined with beam enabling/disabling. The beam enabling/disabling is determining, based on whether an overlapping coverage area between satellites becomes larger, whether to disable a part of beams at an edge of a satellite, to reduce interference between different beams of the satellite.

Figure 4:
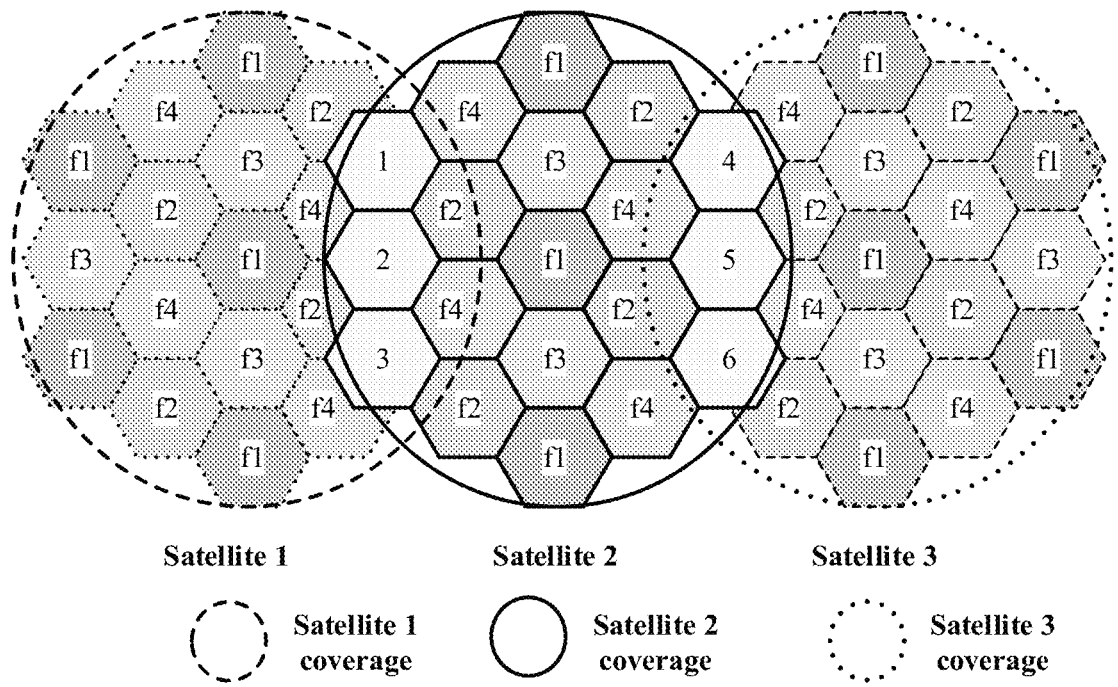
FIG. 4 is a schematic diagram of enabling/disabling a beam in satellite communication in the conventional technology.

For example, FIG. 4 is a schematic diagram of beam enabling/disabling. As shown in FIG. 4, an overlapping coverage area between a satellite 1, a satellite 2, and a satellite 3 is large. In this case, the satellite 2 needs to disable outer beams (beams to be disabled are shown by using numbers 1 to 6 in the figure). In this way, interference between satellites can be reduced. The beam information indication method is combined with the beam enabling/disabling. On one hand, inter-satellite interference in a satellite dynamic motion scenario can be reduced. On the other hand, after detecting interference, a satellite needs to update beam color multiplexing information. According to the beam information indication method provided in this application, signaling overheads caused by beam information update can be further reduced, and beam interference management can also be implemented.

Figure 5A:
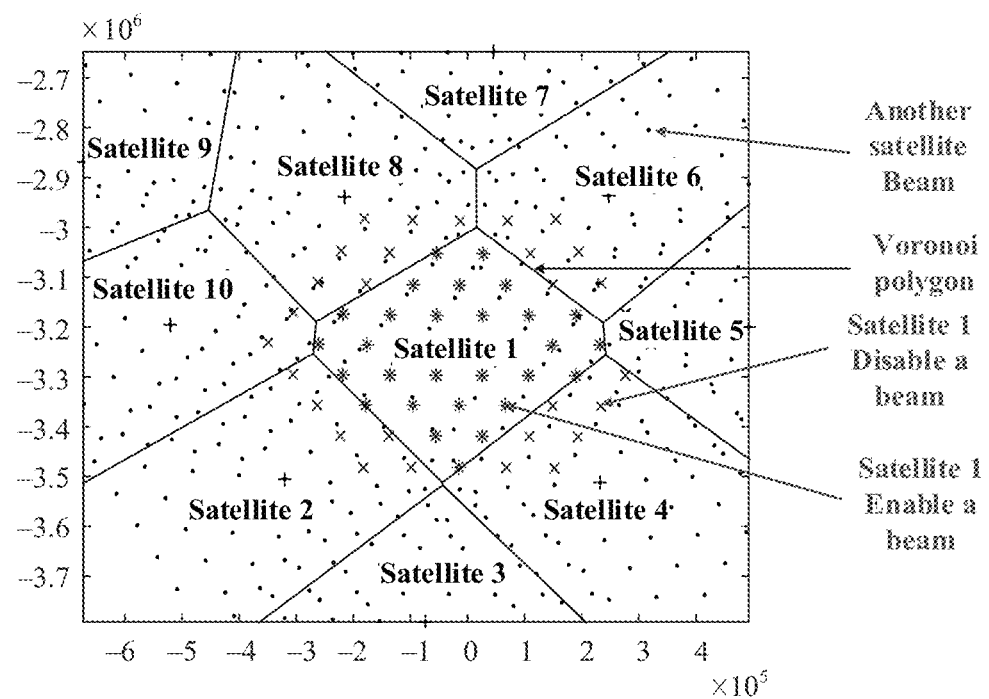
FIG. 5A is a schematic diagram of a method for enabling/disabling a beam in satellite communication according to an embodiment of the present disclosure.
Figure 5B:
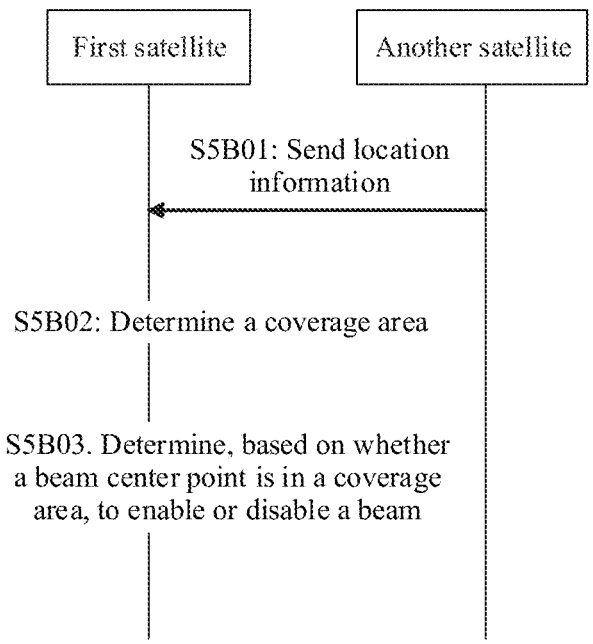
FIG. 5B is a schematic interaction diagram of a method for enabling/disabling a beam in satellite communication according to an embodiment of the present disclosure.

Specifically, as shown in FIG. 5B, this application provides a method for enabling/disabling a beam. The method includes the following steps.

S5B01: A third communication apparatus obtains location information of another communication apparatus.

It should be noted that the another communication apparatus is a communication apparatus other than the third communication apparatus.

For example, the communication apparatuses may be satellites. The following uses an example in which the third communication apparatus is a first satellite and the another communication apparatus is another satellite other than the first satellite for description. In FIG. 5B, a first satellite and another satellite are used as an example. The another satellite includes a plurality of satellites.

S5B02: The first satellite determines a coverage area of the first satellite based on location information of the first satellite and location information of the another satellite.

In a possible implementation, a coverage area of a satellite is determined based on a Voronoi diagram.

Optionally, the Voronoi diagram is two-dimensional or three-dimensional. For example, as shown in FIG. 5A, a satellite 1 to a satellite 10 determine two-dimensional Voronoi diagrams based on location information, as shown by solid lines in FIG. 5A. For example, the satellite 1 is the first satellite. The satellite 1 includes 61 beams. A beam whose center point is located in a Voronoi diagram corresponding to the satellite 1 is enabled, as shown by a point "*" in FIG. 5A. A beam whose center point is located outside the Voronoi diagram corresponding to the satellite 1 is disabled, as shown by a point "+" in FIG. 5A. A beam enabling/disabling rule of another satellite is the same as that of the satellite 1, and details are not described herein again.

Based on the foregoing solution, a coverage area of a satellite is determined by using a Voronoi diagram, to further enable or disable a beam by determining whether a center point of the beam is in a Voronoi diagram corresponding to the satellite. An implementation is simple, and implementing beam enabling/disabling based on a Voronoi diagram method can not only minimize inter-satellite interference, but also ensure full coverage of satellite beams.

In a possible implementation, a coverage area of a satellite is determined based on a shape such as a rectangle or an ellipse.

Optionally, the rectangle or the ellipse corresponds to a coverage/service area of a satellite in a geodetic coordinate system (namely, a two-dimensional longitude and latitude plane).

In a possible implementation, if a time change is greater than a preset value, or a location change between the first satellite and another satellite is greater than a preset value, the first satellite updates the Voronoi diagram.

Based on the foregoing solution, the Voronoi diagram of the satellite can be dynamically updated. When the satellite dynamically changes, the dynamically updated Voronoi diagram is used for adjusting the beam to be enabled or disabled, to achieve optimal beam interference management.

In a possible implementation, the first satellite sends beam enabling/disabling information to another satellite, where the beam enabling/disabling information is an endpoint location or an offset of an expanded or shrunk Voronoi diagram. The offset indicates an offset of the expanded or shrunk Voronoi diagram relative to the Voronoi diagram before expansion or shrinkage.

Based on the foregoing solution, the first satellite expands or shrinks the Voronoi diagram based on a load capability of the third communication apparatus, and transmits information about the expanded or shrunk Voronoi diagram between satellites. This further implements load balancing while reducing inter-satellite interference.

In a possible implementation, the beam enabling/disabling information is carried in a coverage pattern (CoveragePattern) information element in an XnAP message.

For example, a format of the CoveragePattern information element is as follows:

| Information element group/Name (IE Group/Name) | Presence | Range | Information element type and reference (IE type and Reference) | Semantics description | Criticality | Configurable (Assigned Criticality) |
|---|---|---|---|---|---|---|
| Message type (Message_type) | M | | 9.2.13 | | Yes | Reject |
| Pattern location (Pattern_location) | M | 1:N | Enumerated (location 1, location 2, . . . , location N) (Enumerated (loc1, loc2, . . . , locN)) | Location offset information (Location information) | — | |
| Offset (Offset) | Optional (Optional) | 1:N | Enumerated (offset 1, offset 2, . . . , offset N) (Enumerated (offset1, offset2, . . . , offsetN)) | Location offset information (Location offset Information) | — | |

Pattern location indicates an endpoint location of the Voronoi diagram after the satellite is expanded or shrunk, and Offset indicates an offset of the Voronoi diagram after the satellite is expanded or shrunk relative to the Voronoi diagram before the satellite is expanded or shrunk. Endpoint location information may be represented in a form such as latitude and longitude or (x, y, z) in an earth centered earth fixed (ECEF) coordinate system.

S5B03: The first satellite determines, based on whether a center point of a beam is in the coverage area of the first satellite, whether to enable or disable the beam.

According to the method for enabling/disabling a beam provided in this application, a satellite coverage area is determined by using a Voronoi diagram, and then enabling or disabling of a beam is determined based on whether a center point of the beam is in the Voronoi diagram. According to the method for enabling/disabling a beam, not only a coverage area of a satellite beam can be ensured, to avoid insufficient beam coverage caused by a gap between adjacent beams after beam disabling, but also inter-satellite interference can be reduced.

This application provides still another embodiment. The method for enabling/disabling a beam provided in this application is combined with an existing multi-color multiplexing method in satellite communication. The method for enabling/disabling a beam provided in this application can be used for reducing beam interference between satellites. In addition, according to the method for enabling/disabling a beam based on a Voronoi diagram, full coverage of beams while implementing beam enabling and disabling can be ensured, to avoid an insufficient coverage caused by an excessively long distance between enabled beams. Further, with reference to the multi-color multiplexing method, beam interference can be further reduced by multiplexing color information.

Figure 6:
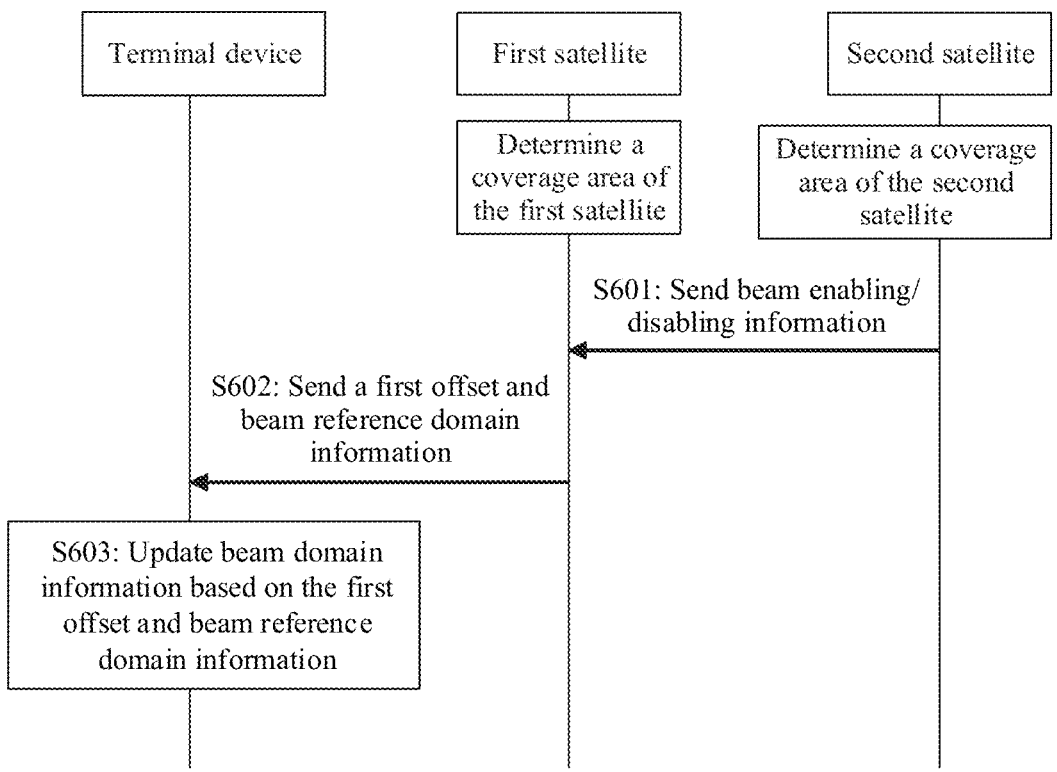
FIG. 6 is a schematic diagram of a beam interference management method in satellite communication according to an embodiment of the present disclosure.

As shown in FIG. 6, this application further provides a method for implementing beam interference management by combining the beam information indication method with the method for enabling/disabling a beam. This embodiment of this application is not limited to a scenario of two satellites, and may be applied to a plurality of satellites. For ease of description, only two satellites are used as an example in FIG. 6 for illustration, and this does not constitute a limitation on this embodiment of this application.

Specifically, the beam interference management method includes:

S601: A second satellite sends beam enabling/disabling information to a first satellite.

For example, the first satellite is a serving satellite, and the second satellite is a neighboring satellite.

It should be noted that, before the second satellite sends the beam enabling/disabling information to the first satellite, a coverage area of the satellite needs to be determined. For example, a Voronoi diagram of each satellite is determined by using location information of all satellites.

The first satellite adjusts a Voronoi diagram (namely, a coverage area of the satellite) based on the beam enabling/disabling information of the second satellite. For example, the second satellite expands or shrinks a Voronoi diagram based on a load capability of the second satellite, and sends an endpoint location or an offset of an expanded or shrunk Voronoi diagram to the first satellite as the beam enabling/disabling information. The first satellite re-determines a Voronoi diagram, and determines whether a center point of a beam is in the Voronoi diagram of the first satellite, to enable or disable the beam.

For a specific implementation of determining a coverage area of a satellite, refer to the foregoing description of the method for enabling/disabling a beam. Details are not described herein again.

Optionally, the first satellite may expand and shrink the Voronoi diagram based on a load capability of the first satellite, and send an endpoint location or an offset of an expanded or shrunk Voronoi diagram to another satellite as the beam enabling/disabling information.

S602: The first satellite sends a first offset and reference domain information of the beam to a terminal device.

S603: The terminal device updates domain information of the beam based on the first offset and the reference domain information of the beam.

For specific implementations of steps S602 and S603, refer to the foregoing embodiments. Details are not described herein again.

It should be noted that when the satellite does not adjust the determined coverage area based on the load capability of the satellite, the satellite directly enables or disables the beam based on the determined coverage area. In this case, step S601 may be omitted.

The foregoing embodiment is applicable to a scenario in which a satellite moves from a low latitude to a high latitude area or a scenario in which a quantity of satellites is large and dense. This can reduce inter-satellite interference and ensure full coverage of a satellite beam range, and may further multiplex beam color information. In a process of multiplexing the beam color information, signaling overheads are further reduced, and multiplexing of the color information reduces interference between beams, to implement efficient beam interference management.

Figure 7A:
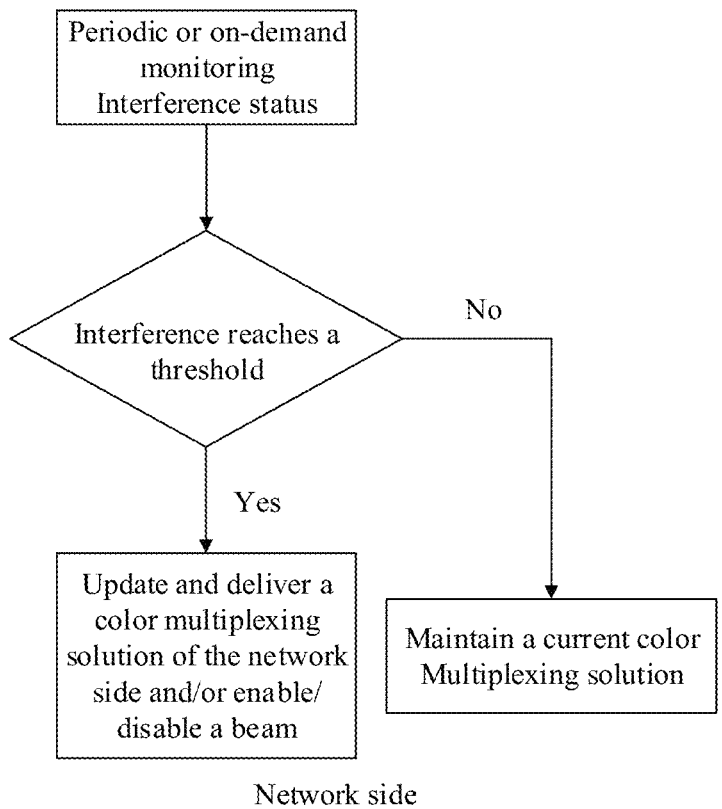
FIG. 7A is a flowchart of beam interference management at a network side in satellite communication according to an embodiment of the present disclosure.

This application provides a method for implementing satellite network interference management. The beam information indication method and/or the method for enabling/disabling a beam provided in this application may be applied to this method. Specifically, the method for implementing satellite network interference management includes:

As shown in FIG. 7A, for a network side, using a satellite as an example, the following steps may be included.

Step 1: The satellite periodically monitors an interference status or monitors an interference status based on a requirement of the satellite.

Step 2: After the satellite monitors the interference status, if interference reaches a preset threshold, the satellite adjusts and updates a beam color multiplexing solution and/or enables/disables a beam based on the interference status, and delivers an updated beam color multiplexing solution and/or beam enabling/disabling information. If interference falls within a range of a preset threshold, the satellite maintains a current status of a beam color multiplexing solution and/or a beam enabling/disabling status.

Based on the foregoing embodiment, the satellite adjusts the beam color multiplexing solution based on the interference status, and updates the beam color multiplexing solution by using the beam information indication method provided in this application. For example, an updated reference color multiplexing information and a first offset are re-delivered, or a first offset is re-delivered. This can further reduce signaling overheads while implementing beam interference management. Optionally, inter-satellite interference may be further reduced with reference to the method for enabling/disabling a beam, to implement more adequate beam interference management while ensuring full coverage of satellite beams.

Figure 7B:
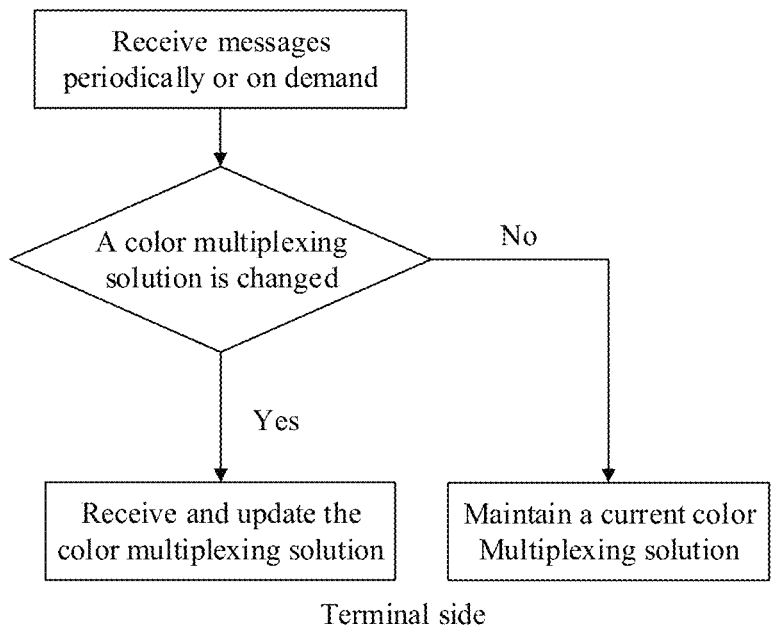
FIG. 7B is a flowchart of beam interference management at a terminal side in satellite communication according to an embodiment of the present disclosure.

As shown in FIG. 7B, corresponding to a terminal side, the following steps may be included.

Step 1: The terminal device periodically receives a message from the satellite, or sends, based on a requirement of the terminal device, a message for requesting reference color information to the satellite, for example, the terminal device does not receive the beam reference color information within a preset time range or the beam reference color information is incorrect, causing large beam interference. Correspondingly, the terminal device receives the message sent by the satellite. For example, the message is an SIB message.

Step 2: The terminal device determines, based on the message sent by the satellite, whether a color multiplexing solution changes, and if the color multiplexing solution changes, the terminal device performs update based on a changed color multiplexing solution; or if the color multiplexing solution does not change, the terminal device maintains the current color multiplexing solution and does not perform update.

Based on the foregoing embodiment, the terminal device determines and updates the color multiplexing information based on the message delivered by the satellite, so that the color multiplexing information is consistent with satellite-side information, and beam interference management is implemented.

An embodiment of this application further provides an apparatus 800. The apparatus 800 may be a terminal device or a network device, may be an apparatus in a terminal device or a network device, or may be an apparatus that can match a terminal device and a network device for use. In a possible implementation, the communication apparatus 800 may include modules or units that one to one correspond to the methods/operations/steps/actions performed by the terminal device in the foregoing method embodiments. The units may be hardware circuits, software, or may be implemented by a hardware circuit in combination with software. In a possible implementation, the apparatus 800 may include a transceiver unit 810 and a processing unit 820. The transceiver unit 810 may perform external communicate, and the processing unit 820 is configured to perform data processing. The transceiver unit 810 may also be referred to as a communication interface or a communication unit.

When the apparatus 800 is configured to perform an operation performed by the terminal, in a possible implementation, the transceiver unit 810 and the processing unit 820 may be further configured to perform the following steps in the foregoing method. For example, in an embodiment, the transceiver unit 810 is configured to obtain a first offset, where the first offset indicates an offset of domain information of a plurality of beams relative to reference domain information of the plurality of beams, and the domain information includes one or more of the following information: time domain information, frequency domain information, and polarization domain information.

The processing unit 820 is configured to update the domain information of the plurality of beams based on the reference domain information and the first offset of the plurality of beams.

In a possible implementation, the first offset is an offset relative to a reference domain information identifier or the reference domain information.

In a possible implementation, the reference domain information is domain information obtained at a reference moment or domain information determined before a current moment.

In a possible implementation, the domain information is carried in a bandwidth part BWP information element.

In a possible implementation, the transceiver unit 810 is further configured to request the reference domain information from a satellite.

In another embodiment, the transceiver unit 810 is configured to obtain domain information identifiers of a plurality of beams, where the domain information identifiers indicate domain information of the plurality of beams, and the domain information includes one or more of the following information: time domain information, frequency domain information, and polarization domain information.

The processing unit 820 is configured to separately update the domain information of the plurality of beams based on the domain information identifiers.

In still another embodiment, the transceiver unit 810 is configured to obtain a reference multiplexing information identifier and a reference multiplexing information identifier change value, where the reference multiplexing information identifier indicates reference multiplexing information of a plurality of beams, the reference multiplexing information identifier change value indicates a value of a changed reference multiplexing information identifier, and the reference multiplexing information includes one or more of the following information: time domain information, frequency domain information, and polarization domain information.

The processing unit 820 is configured to update the reference multiplexing information of the plurality of beams based on the reference multiplexing information identifier change value.

When the communication apparatus 800 is configured to perform an operation performed by the network device, in an embodiment, the transceiver unit 810 and the processing unit 820 may be configured to perform the following steps in the foregoing method. For example, the processing unit 820 is configured to determine a first offset, where the first offset indicates an offset of domain information of a plurality of beams relative to reference domain information of the plurality of beams, and the domain information includes one or more of the following information: time domain information, frequency domain information, and polarization domain information.

The transceiver unit 810 is configured to send the first offset.

In a possible implementation, the first offset is an offset relative to a reference domain information identifier or the reference domain information.

In a possible implementation, the reference domain information is domain information sent at a reference moment.

In a possible implementation, the domain information is carried in a bandwidth part BWP information element.

In a possible implementation, the transceiver unit 810 is further configured to receive a request message sent by the terminal device, where the request message is used for requesting the reference domain information. Correspondingly, the transceiver unit 810 sends the reference domain information to the terminal device.

In yet another embodiment, the processing unit 820 is configured to determine domain information identifiers of a plurality of beams, where the domain information identifiers indicate domain information of the plurality of beams, and the domain information includes one or more of the following information: time domain information, frequency domain information, and polarization domain information.

The transceiver unit 810 is configured to send the domain information identifiers of the plurality of beams.

In still yet another embodiment, the processing unit 820 is configured to determine a reference multiplexing information identifier and a reference multiplexing information identifier change value, where the reference multiplexing information identifier indicates reference multiplexing information of a plurality of beams, and the reference multiplexing information identifier change value indicates a value of a changed reference multiplexing information identifier.

The transceiver unit 810 is configured to send the reference multiplexing information identifier and the reference multiplexing information identifier change value.

In a further embodiment, the transceiver unit 810 and the processing unit 820 may be further configured to perform the following steps in the foregoing method. For example, the transceiver unit 810 is configured to obtain location information of another satellite.

The processing unit 820 is configured to determine a coverage area of a first satellite based on location information of the first satellite and the location information of the another satellite.

The processing unit 820 is further configured to determine, based on whether a center point of a beam is in the coverage area of the first satellite, to enable or disable the beam.

It should be noted that the transceiver unit 810 is further configured to perform other receiving or sending steps or operations performed by the terminal and the network device in the foregoing method embodiments. The processing unit 820 may be further configured to perform corresponding steps or operations, other than receiving and sending, performed by the terminal and the network device in the foregoing method embodiments. Details are not described herein again.

It should be noted that in a specific embodiment of the present disclosure, the apparatus 800 may be the terminal device or the network device in the foregoing method embodiments. In other words, in specific implementation, for function implementation and beneficial effects of each module of the apparatus 800, refer to descriptions of related method steps in the foregoing method embodiments. For brevity of the specification, details are not described herein again.

Figure 8:
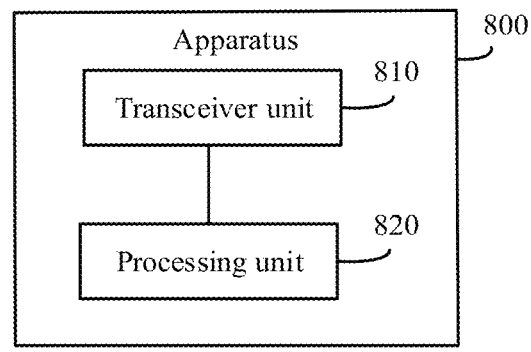
FIG. 8 is a schematic diagram of a structure of an apparatus according to an embodiment of the present disclosure.

It should be understood that FIG. 8 is merely an example, not a limitation. The terminal device including the transceiver unit and the processing unit may not depend on the structure shown in FIG. 8.

When the apparatus 800 is a chip, the chip includes a transceiver unit and a processing unit. The transceiver unit may be an input/output circuit or a communication interface. The processing unit may be a processor, a microprocessor, or an integrated circuit that is integrated on the chip.

In this embodiment, the apparatus 800 is presented in a form in which the functional units are obtained through division in an integrated manner. The "unit" herein may be an ASIC, a circuit, a processor that executes one or more software or firmware programs, a memory, an integrated logic circuit, and/or another component capable of providing the foregoing functions.

Figure 9:
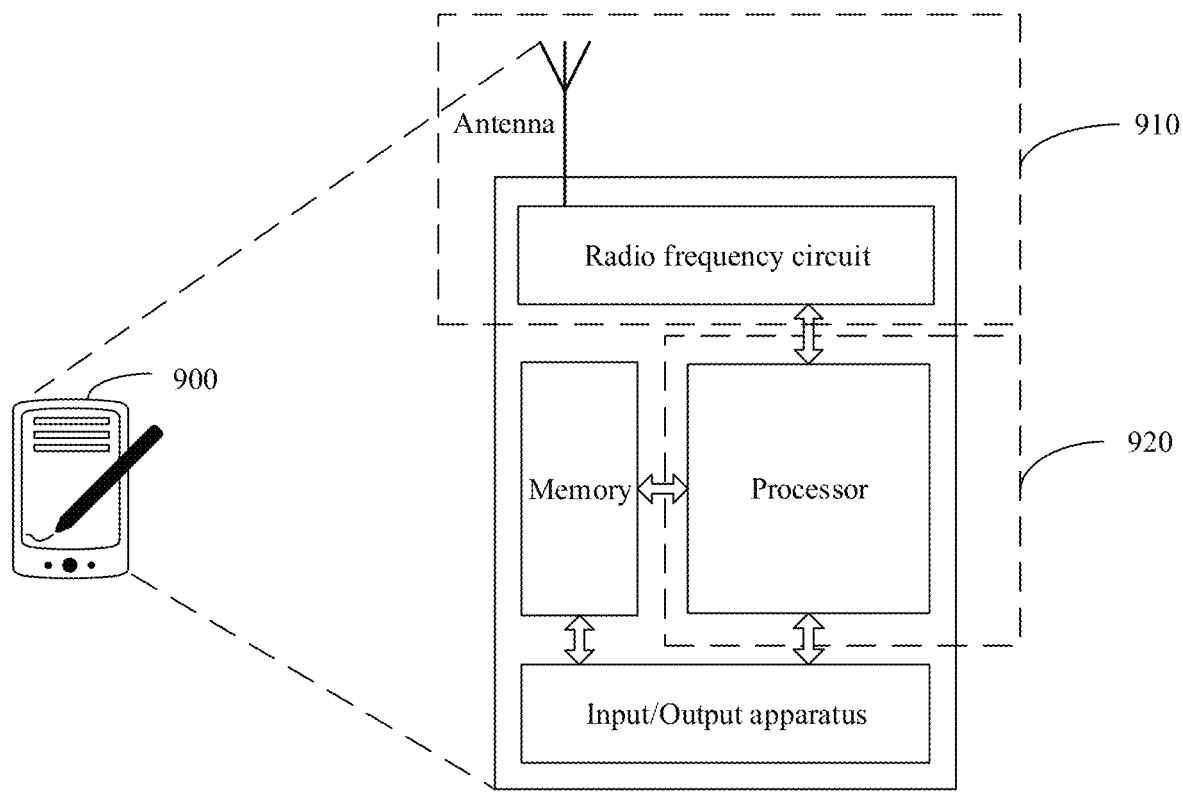
FIG. 9 is a schematic diagram of a structure of another apparatus according to an embodiment of the present disclosure.

FIG. 9 is a simplified schematic diagram 900 of a structure of a terminal. For ease of understanding and convenience of figure illustration, an example in which the terminal is a mobile phone is used in FIG. 9. As shown in FIG. 9, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminals may not have the input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, an antenna having sending and receiving functions and the radio frequency circuit may be considered as a receiving unit and a sending unit (which may also be collectively referred to as a transceiver unit) of the terminal, and a processor having a processing function may be considered as a processing unit of the terminal. As shown in FIG. 9, the terminal includes a transceiver unit 910 and a processing unit 920. The transceiver unit 910 may alternatively be referred to as a receiver/transmitter (sender), a receiver/transmitter machine, a receiver/transmitter circuit, or the like. The processing unit 920 may also be referred to as a processor, a processing board, a processing module, a processing apparatus, or the like. The transceiver unit 910 and the processing unit 920 may be configured to perform actions of the terminal in the foregoing method embodiments. For example, in an embodiment, the transceiver unit 910 may be configured to obtain a first offset. The processing unit 920 is configured to update domain information of a plurality of beams based on reference domain information of the plurality of beams and the first offset.

In another embodiment, the transceiver unit 910 may be configured to obtain domain information identifiers of a plurality of beams, where the domain information identifiers indicate domain information of a plurality of beams, and the domain information includes one or more of the following information: time domain information, frequency domain information, and polarization domain information. The processing unit 920 is configured to separately update the domain information of the plurality of beams based on the domain information identifiers.

In still another embodiment, the transceiver unit 910 may be configured to obtain a reference multiplexing information identifier and a reference multiplexing information identifier change value. The processing unit 920 is configured to update reference multiplexing information of a plurality of beams based on the reference multiplexing information identifier change value.

All related content and beneficial effects of the steps in the foregoing method embodiments may be referenced to function descriptions of corresponding functional components, and details are not described herein again.

Figure 10:
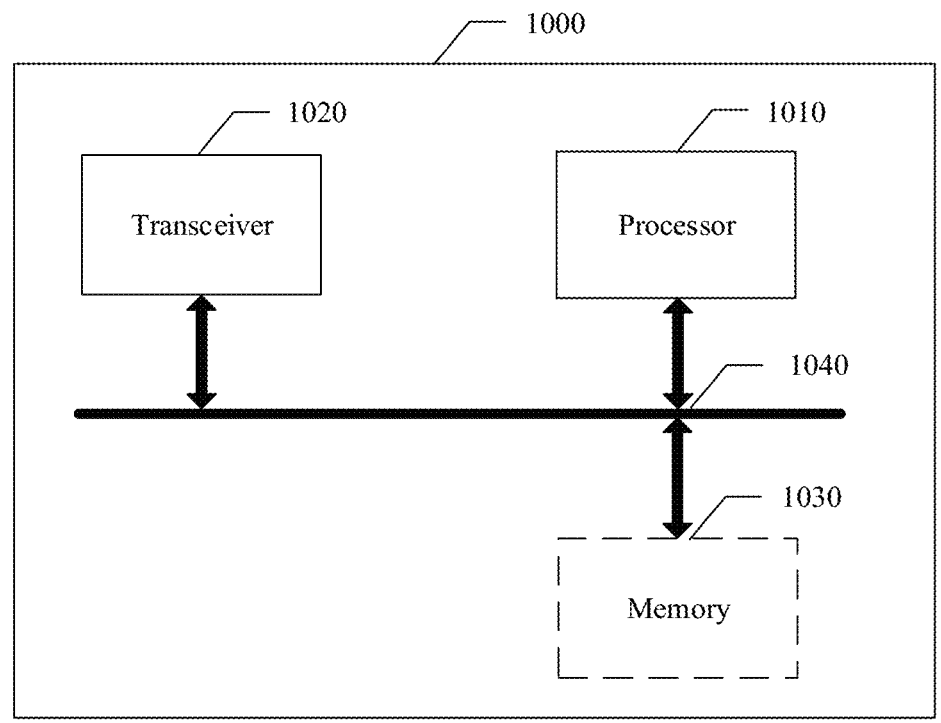
FIG. 10 is a schematic diagram of a structure of still another apparatus according to an embodiment of the present disclosure.

As shown in FIG. 10, an embodiment of this application further provides an apparatus 1000. The apparatus 1000 is configured to implement functions of the network device in the foregoing methods. The apparatus may be a network device, may be an apparatus in the network device, or may be an apparatus that can be used together with the network device. The apparatus 1000 may be a chip system. In this embodiment of this application, the chip system may include a chip, or may include a chip and another discrete component. The apparatus 1000 includes at least one processor 1010, configured to implement the functions of the network device in the method provided in embodiments of this application. The apparatus 1000 may further include a transceiver 1020.

The apparatus 1000 may be specifically configured to perform a related method performed by the network device in the foregoing method embodiments. The network device is, for example, a satellite.

For example, in an embodiment, the transceiver 1020 is configured to send data (for example, reference domain information of a plurality of beams and a first offset) to a terminal device, or receive a request (for example, a request for reference domain information) from the terminal device. The processor 1010 is configured to determine the first offset.

In another embodiment, the transceiver 1020 is configured to send data (for example, domain information identifiers of a plurality of beams) to a terminal device, or receive a request (for example, a request for domain information identifier) of the terminal device. The processor 1010 is configured to determine the domain information identifiers of the plurality of beams.

In still another embodiment, the transceiver 1020 is configured to send data (for example, a reference multiplexing information identifier and a reference multiplexing information identifier change value) to a terminal device. The processor 1010 is configured to determine the reference multiplexing information identifier and the reference multiplexing information identifier change value.

In yet another embodiment, the transceiver 1020 is configured to obtain location information of another satellite, and the processor 1010 is configured to determine a coverage area of a first satellite based on location information of the first satellite and the location information of the another satellite. The processor 1010 is further configured to determine, based on whether a center point of a beam is in a coverage area of the first satellite, to enable or disable the beam.

It should be noted that in specific implementation, for function implementation of each module of the apparatus 1000, refer to descriptions of related method steps in the foregoing method embodiments. For brevity of the specification, details are not described herein again.

The apparatus 1000 may further include at least one memory 1030, configured to store program instructions and/or data. The memory 1030 is coupled to the processor 1010. The coupling in this embodiment of this application may be an indirect coupling or a communication connection between apparatuses, units, or modules. The coupling may be implemented in electronic, mechanical, and other forms, and is used for information exchange between the apparatuses, the units, or the modules. The processor 1010 may cooperate with the memory 1030. The processor 1010 may execute the program instructions stored in the memory 1030. In a possible implementation, at least one of the at least one memory may be integrated with the processor. In another possible implementation, the memory 1030 is located outside the apparatus 1000.

In this embodiment of this application, a specific connection medium between the transceiver 1020, the processor 1010, and the memory 1030 is not limited. In this embodiment of this application, the memory 1030, the processor 1010, and the transceiver 1020 are connected by using a bus 1040 in FIG. 10. The bus is represented by using a bold line in FIG. 10. The foregoing is merely an example for description. A connection manner of other components is not limited thereto. The bus may be classified into an address bus, a data bus, a control bus, and the like. For ease of representation, only one thick line is for representing the bus in FIG. 10, but this does not mean that there is only one bus or only one type of bus.

In this embodiment of this application, the processor 1010 may be one or more central processing units (CPUs). When the processor 1010 is one CPU, the CPU may be a single-core CPU or a multi-core CPU. The processor 1010 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 1030 may include but is not limited to a non-volatile memory such as a hard disk drive (HDD) or a solid-state drive (SSD), a random access memory (RAM), an erasable programmable read-only memory (Erasable Programmable ROM, EPROM), a read-only memory (ROM), a portable read-only memory, Compact Disc Read-Only Memory (CD-ROM), or the like. The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data. The memory 1030 is configured to store related instructions and data.

As shown in FIG. 11, an embodiment of this application further provides an apparatus 1100, configured to implement functions of the terminal device and the network device in the foregoing methods. The apparatus 1100 may be a communication apparatus or a chip in a communication apparatus. The apparatus includes: at least one input/output interface 1110 and a logic circuit 1120. The input/output interface 1110 may be an input/output circuit. The logic circuit 1120 may be a signal processor, a chip, or another integrated circuit that can implement the methods in this application.

The apparatus 1100 may further include at least one memory 1130, configured to store program instructions and/or data. The memory 1130 is coupled to the logic circuit 1120. The coupling in this embodiment of this application may be an indirect coupling or a communication connection between apparatuses, units, or modules. The coupling may be implemented in electronic, mechanical, and other forms, and is used for information exchange between the apparatuses, the units, or the modules. The logic circuit 1120 may cooperate with the memory 1130. The logic circuit 1120 may execute the program instructions stored in the memory 1130. In a possible implementation, at least one of the at least one memory may be integrated with the logic circuit. In another possible implementation, the memory 1130 is located outside the apparatus 1100.

The at least one input/output interface 1110 is configured to input or output a signal or data.

For example, when the apparatus is a terminal or is applied to a terminal, in an embodiment, the input/output interface 1110 is configured to input beam reference domain information and a first offset, where the first offset indicates an offset of beam domain information relative to the beam reference domain information. The input/output interface 1110 is further configured to output a request message to a satellite to request reference domain information.

In another embodiment, the input/output interface 1110 is configured to input a beam domain information identifier.

In still another embodiment, the input/output interface 1110 is configured to input a reference multiplexing information identifier and a reference multiplexing information identifier change value.

For example, when the apparatus is a network device, in an embodiment, the input/output interface 1110 is configured to output beam reference domain information and a first offset, where the first offset indicates an offset of beam domain information relative to the beam reference domain information. The input/output interface 1110 is further configured to output the reference domain information to the terminal device.

In another embodiment, the input/output interface 1110 is configured to output a beam domain information identifier.

In still another embodiment, the input/output interface 1110 is configured to output a reference multiplexing information identifier and a reference multiplexing information identifier change value.

In still another embodiment, the input/output interface 1110 is configured to input location information of another satellite.

The logic circuit 1120 is configured to perform a part or all of the steps in any one of the methods provided in embodiments of this application. The logic circuit may implement the functions implemented by the processing unit 820 in the apparatus 800 and the processor 1010 in the apparatus 1000.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

Based on a same concept as the foregoing method embodiments, an embodiment of this application further provides a computer-readable storage medium. The computer-readable storage medium stores a computer program. The computer program is executed by hardware (for example, a processor), to implement a part or all of the steps in any one of the methods performed by any apparatus in embodiments of this application.

Based on a same concept as the foregoing method embodiments, an embodiment of this application further provides a computer program product including instructions. When the computer program product runs on a computer, the computer is enabled to perform a part or all of the steps in any one of the methods in the foregoing aspects.

Based on a same concept as the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement an operation performed by the terminal or the network device in any one of the foregoing method embodiments and the possible implementations of the method embodiments. The chip system may include the chip, or may include the chip and another discrete component, such as a memory (or a storage module) and/or a transceiver (or a communication module).

Based on a same concept as the foregoing method embodiments, this application further provides a communication system. The communication system may include the foregoing terminal and/or the foregoing network device. The communication system may be configured to implement an operation performed by the terminal or the network device in any one of the foregoing method embodiments and the possible implementations of the method embodiments. For example, the communication system may have the structure shown in FIG. 1.

A part or all of the foregoing embodiments may be implemented by using software, hardware, firmware, or any combination thereof. When software is used for implementing embodiments, all or a part of embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the description of each embodiment has respective focuses. For a part that is not described in detail in an embodiment, refer to related descriptions in other embodiments.

In the foregoing embodiments, the description of each embodiment has respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of embodiments.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application.

The foregoing description is merely some specific implementations of this application, but is not intended to limit the protection scope of this application. Any person skilled in the art may make changes and modifications to these embodiments within the technical scope disclosed in this application. Therefore, the following claims are intended to be construed as to cover the foregoing embodiments and to indicate changes and modifications falling within the scope of this application. Therefore, the protection scope of this application shall be subject to the protection scope of the claims.

What is claimed is:

1. A beam information indication method, the method comprising:
    obtaining, by a first communication apparatus, a first offset, wherein the first offset indicates an offset of domain information of a plurality of beams relative to reference domain information of the plurality of beams, wherein the domain information comprises frequency domain information and polarization domain information, wherein each beam of the plurality of beams corresponds to a different color in color multiplexing information, and wherein each color corresponds to a different combination of a frequency mode and a polarization mode; and
    updating, by the first communication apparatus, the domain information of the plurality of beams based on the reference domain information of the plurality of beams and the first offset.

2. The method according to claim 1, wherein the first offset is an offset relative to a reference domain information identifier or the reference domain information.

3. The method according to claim 1, wherein the reference domain information is domain information obtained at a reference moment or domain information determined before a current moment.

4. The method according to claim 1, wherein the domain information is carried in a bandwidth part (BWP) information element.

5. The method according to claim 1,
wherein the time domain information comprises a frame, a subframe, a slot, a mini-slot, or a symbol;
wherein the frequency domain information comprises a frequency or a frequency channel number; and
wherein the polarization domain information comprises at least one of left hand circular polarization (LHCP) or right hand circular polarization (RHCP).

6. The method according to claim 1, wherein the domain information of the plurality of beams is updated periodically, and the domain information comprises at least one of the reference domain information, the first offset, or a quantity of beams.

7. The method according to claim 6, wherein:
reference domain information of the plurality of beams in a current period is different from reference domain information of the plurality of beams in a period before the current period;
a value range of the first offset of the plurality of beams in a current period is different from that in a period before the current period; or
a quantity of beams in a current period is different from a quantity of beams in a period before the current period.

8. The method according to claim 1, wherein the first communication apparatus does not obtain the reference domain information within a preset duration, the method further comprising:
requesting, by the first communication apparatus, the reference domain information from a second communication apparatus.

9. The method according to claim 1, wherein the first offset is carried in a system information block (SIB).

10. A beam information indication method, the method comprising:
determining, by a second communication apparatus, a first offset, wherein the first offset indicates an offset of domain information of a plurality of beams relative to reference domain information of the plurality of beams, and the domain information comprises frequency domain information and polarization domain information, wherein each beam of the plurality of beams corresponds to a different color in color multiplexing information, and wherein each color corresponds to a different combination of a frequency mode and a polarization mode; and
sending, by the second communication apparatus, the first offset.

11. The method according to claim 10, wherein the first offset is an offset relative to a reference domain information identifier or the reference domain information.

12. The method according to claim 10, wherein the reference domain information is domain information sent at a reference moment.

13. The method according to claim 10, wherein the domain information is carried in a bandwidth part (BWP) information element.

14. The method according to claim 10,
wherein the time domain information comprises a frame, a subframe, a slot, a mini-slot, or a symbol;
wherein the frequency domain information comprises a frequency or a frequency channel number; and
wherein the polarization domain information comprises at least one of left hand circular polarization (LHCP) or right hand circular polarization (RHCP).

15. The method according to claim 10, wherein the domain information of the plurality of beams is updated periodically, and the domain information comprises at least one of the reference domain information, the first offset, or a quantity of beams.

16. The method according to claim 15, wherein:
reference domain information of the plurality of beams in a current period is different from reference domain information of the plurality of beams in a period before the current period;
a value range of the first offset of the plurality of beams in a current period is different from that in a period before the current period; or
a quantity of beams in a current period is different from a quantity of beams in a period before the current period.

17. The method according to claim 16, further comprising:
receiving, by the second communication apparatus, a request of a first communication apparatus; and
sending, by the second communication apparatus, the reference domain information to the first communication apparatus.

18. The method according to claim 10, wherein the first offset is carried in a system information block (SIB) and is sent by the second communication apparatus via broadcasting.

19. A communication apparatus, comprising a logic circuit and an input/output interface, wherein the input/output interface is configured to input the first offset, and the logic circuit is configured to perform the method according to claim 1.

20. A communication apparatus, comprising a logic circuit and an input/output interface, wherein the input/output interface is configured to output the first offset, and the logic circuit is configured to perform the method according to claim 10.

* * * * *